United States Patent [19]
Dhole

[11] Patent Number: 5,824,888
[45] Date of Patent: Oct. 20, 1998

[54] FLUID EFFICIENCY

[75] Inventor: Vikas Raghunath Dhole, Stockport, United Kingdom

[73] Assignee: Linnhoff March Limited, Northwich, England

[21] Appl. No.: 583,945

[22] Filed: Jan. 11, 1996

[30] Foreign Application Priority Data

Jan. 11, 1995 [GB] United Kingdom .................. 9500522

[51] Int. Cl.$^6$ ............................. G01L 3/26; G01B 17/00
[52] U.S. Cl. ........................................ 73/112; 364/551.01
[58] Field of Search .............................. 364/551.01, 506, 364/509; 73/112

[56] References Cited

U.S. PATENT DOCUMENTS

| 4,584,654 | 4/1986 | Crane .................................. 73/112 X |
| 4,720,806 | 1/1988 | Schippers et al. ................ 364/551.01 |
| 5,513,519 | 5/1996 | Cauger et al. ........................... 73/112 |

FOREIGN PATENT DOCUMENTS

| 4-191618 | 7/1992 | Japan ...................................... 73/112 |
| 6-129882 | 5/1994 | Japan ...................................... 73/112 |
| WO 94/22025 | 9/1994 | WIPO ............................... 364/551.01 |

OTHER PUBLICATIONS

Rossiter, "Process Integration For Wastewater Minimization", Southern States Environmental Conference, Biloxi, MS, 10,26–28/93, pp. 1–18 and appendix.

Wang, "Wastewater Minimization", Department of Process Integration, UMIST, Manchester, UK, pp. 1–31 and appendix.

Linnhoff, "A User Guide on Process Integration for the Efficient Use of Energy", Institution of Chemical Engineers, 1982, Rugby, UK, Index and pp. 242–247.

Smith, "Water and Wasetwater Minimisation" (brochure).

*Primary Examiner*—George M. Dombroske
*Assistant Examiner*—Paul D. Amrozowicz
*Attorney, Agent, or Firm*—Lee, Mann, Smith, McWilliams, Sweeney & Ohlson

[57] ABSTRACT

For each process unit in a multi-process unit plant, a required input and output of a fluid (eg water), in terms of both purity and flow-rate of the fluid, is determined. All of the inputs and outputs of all of the process units are represented in a graphical or tabular form, in terms of both purity and flow-rate of the fluid. The efficiency of use of the fluid is then indicated by the graphical or tabular representation. Connections between the process units may be derived from the graphical or tabular representation, to increase re-use or re-generation of the fluid between the process units. Efficiency of use of the fluid in the multi-process unit plant may then be increased by effecting those connections between the process units.

11 Claims, 24 Drawing Sheets

(a) Limiting composite curve
(b) Pinch design grid
(c) Conventional flowsheet

Flowrates in Te/hr

| Process Units | | $P_1$ | $P_2$ | $P_3$ | $P_4$ | |
|---|---|---|---|---|---|---|
| Water Demands | Water Sources | $S_1$ (20) | $S_2$ (100) | $S_3$ (40) | $S_4$ (10) | FRESH WATER DEMANDS |
| $P_1$ | $D_1$ (20) | $SD_{11}$ | $SD_{21}$ | $SD_{31}$ | $SD_{41}$ | $F_1$ |
| $P_2$ | $D_2$ (100) | $SD_{12}$ | $SD_{22}$ | $SD_{32}$ | $SD_{42}$ | $F_2$ |
| $P_3$ | $D_3$ (40) | $SD_{13}$ | $SD_{23}$ | $SD_{33}$ | $SD_{43}$ | $F_3$ |
| $P_4$ | $D_4$ (10) | $SD_{14}$ | $SD_{24}$ | $SD_{34}$ | $SD_{44}$ | $F_4$ |
| WASTEWATER | | $W_1$ | $W_2$ | $W_3$ | $W_4$ | |

Objective: $\text{Min} \sum_j F_j$

OR $\text{Min}\left[\sum_j FCost_j * F_j + \sum_i WCost_i * W_i\right]$

Fig. 10

Water balances:

$$D_j = \sum_i SD_{ij} + F_j$$

(Number of equations = Number of Demands)

$$S_i = \sum_j SD_{ij} + W_i$$

(Number of equations = Number of Supplies)

Concentration constraints:

$$\frac{\sum_i CS_i * SD_{ij}}{D_j} \leq CD_j$$

(Number of equations = Number of demands x Number of containments)

Notation:
- i — Counter for sources
- j — Counter for demands
- P — Process unit
- $S_i$ — Total water flowrate of source $i$
- $D_j$ — Total water flowrate of demand $j$
- $SD_{ij}$ — Water flowrate from source to demand $j$
- $CS_i$ — Specified containment concentration for source $i$
- $CD_j$ — Specified containment concentration for demand $j$
- $Cost_j$ — Cost of fresh water $F_j$
- $Cost_i$ — Cost of waste water treatment of $W_i$

|  |  | $P_1$ $S_1$ (20) | $P_2$ $S_2$ (100) | $P_3$ $S_3$ (40) | $P_4$ $S_4$ (10) | FRESH WATER DEMANDS |
|---|---|---|---|---|---|---|
| $P_1$ | $D_1$(20) | - | - | - | - | 20 |
| $P_2$ | $D_2$(100) | - | 50 | - | - | 50 |
| $P_3$ | $D_3$(40) | 20 | - | - | - | 20 |
| $P_4$ | $D_4$(10) | - | 10 | - | - | 0 |
| WASTEWATER | | 0 | 40 | 40 | 10 | |

Minimum Fresh water Demand = 90 te/hr

*Fig. 11*

VISUALISATION
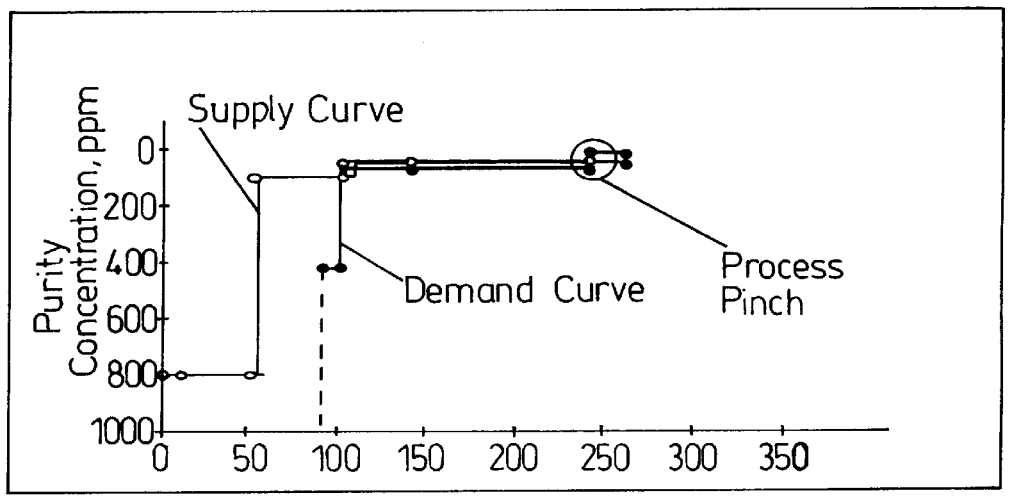
DESIGN
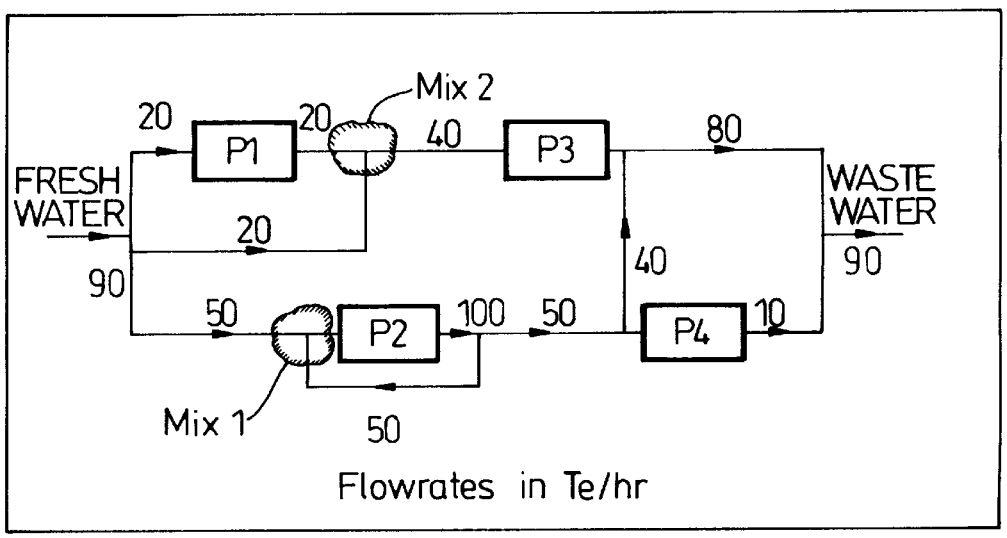
Flowrates in Te/hr
LP REPRESENTATION
|     |          | $P_1$ $S_1$ [20] | $P_2$ $S_2$ [100] | $P_3$ $S_3$ [40] | $P_4$ $S_4$ [10] | FRESH WATER DEMANDS |
|-----|----------|------|-------|------|------|----|
| $P_1$ | $D_1$ [20]  | –    | –     | –    | –    | 20 |
| $P_2$ | $D_2$ [100] | –    | 50    | –    | –    | 50 |
| $P_3$ | $D_3$ [40]  | 20   | –     | –    | –    | 20 |
| $P_4$ | $D_4$ [10]  | –    | ~~10~~ | –   | –    | 0  |
| WASTEWATER | | 0 | 40 | 40 | 10 | |
Minimum Fresh water Demand = 90 te/hr
*Fig. 14*

(a) Composite Curve Representation
(b) Grand Composite Curve Representation

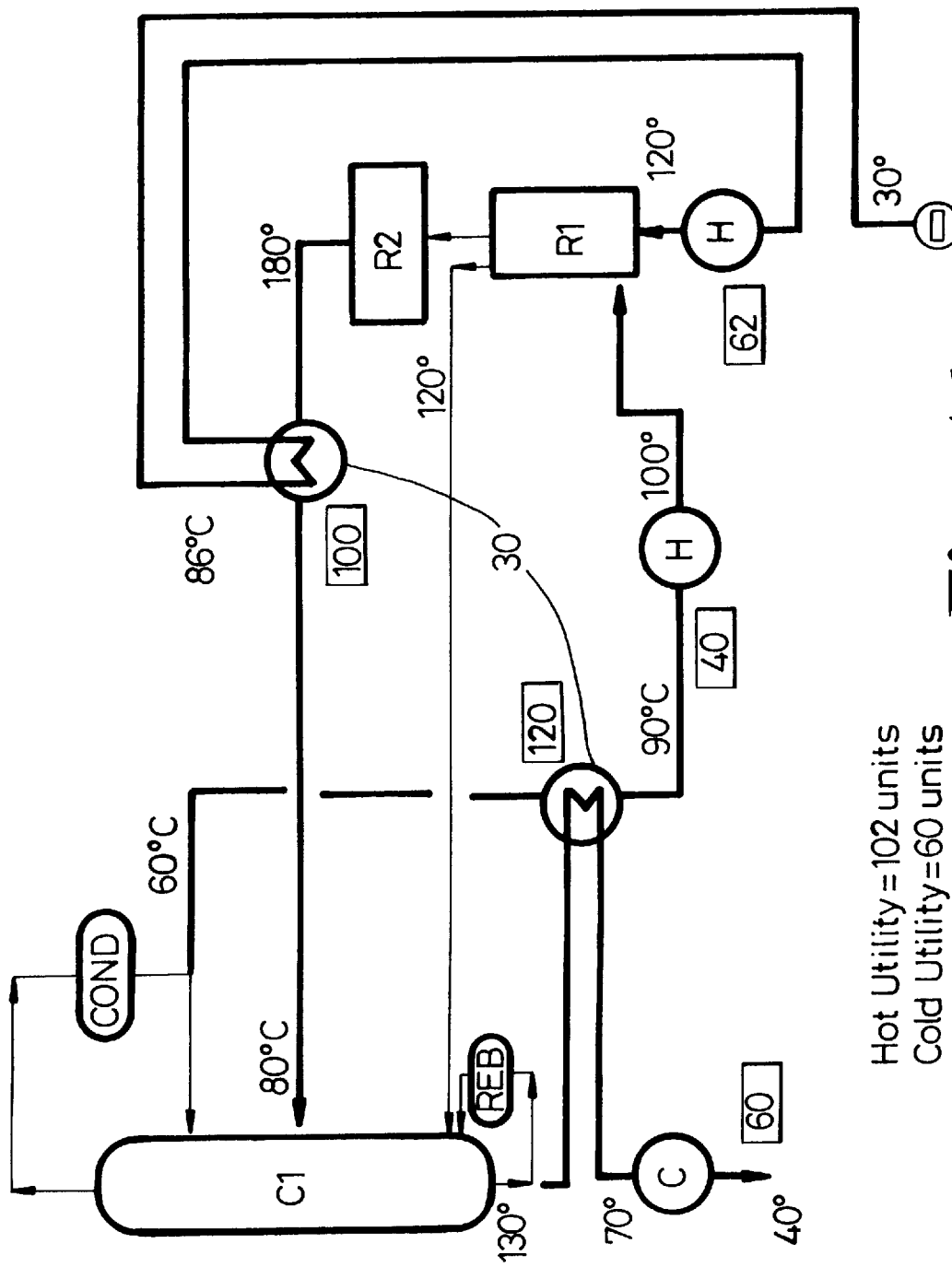
Fig. A1

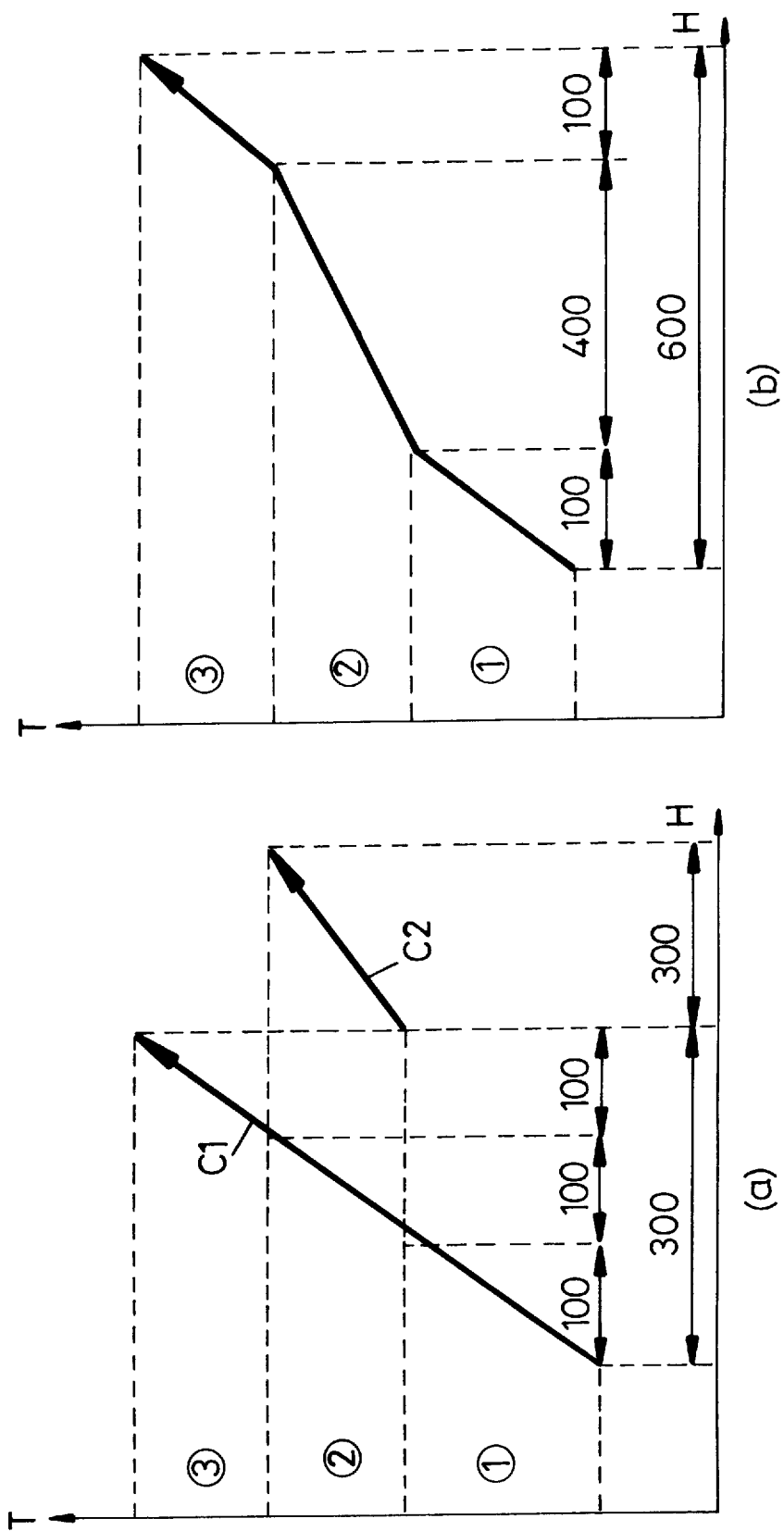
Fig. A2

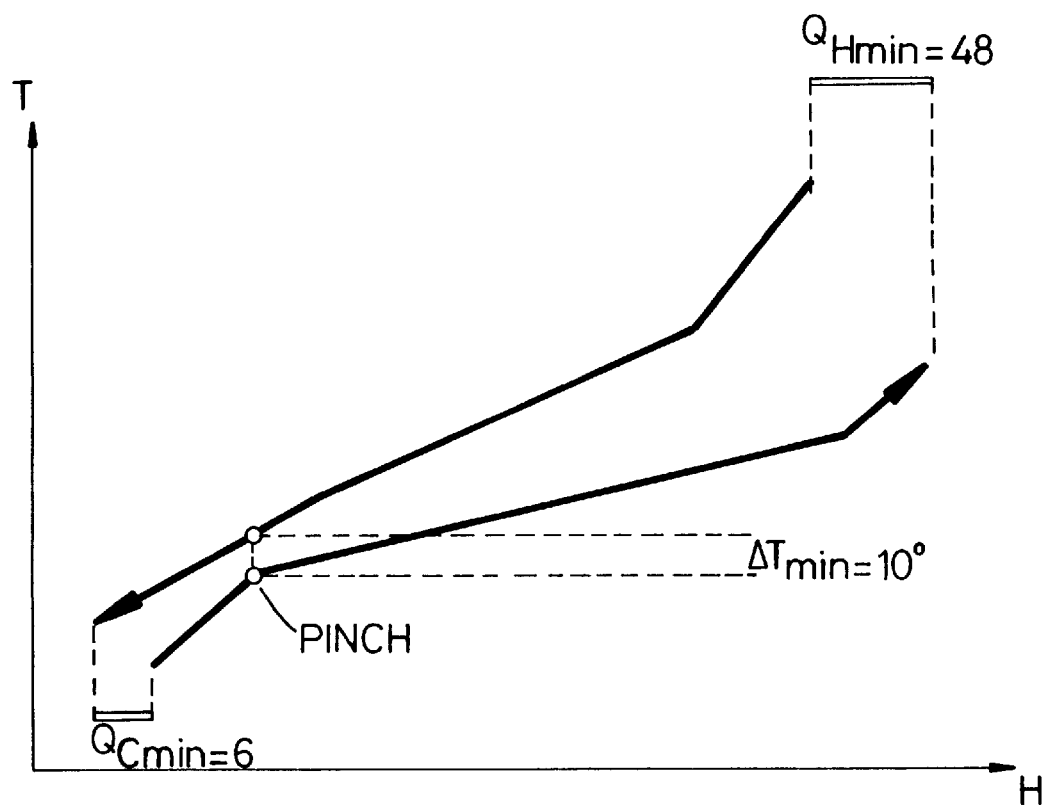
Fig. A3

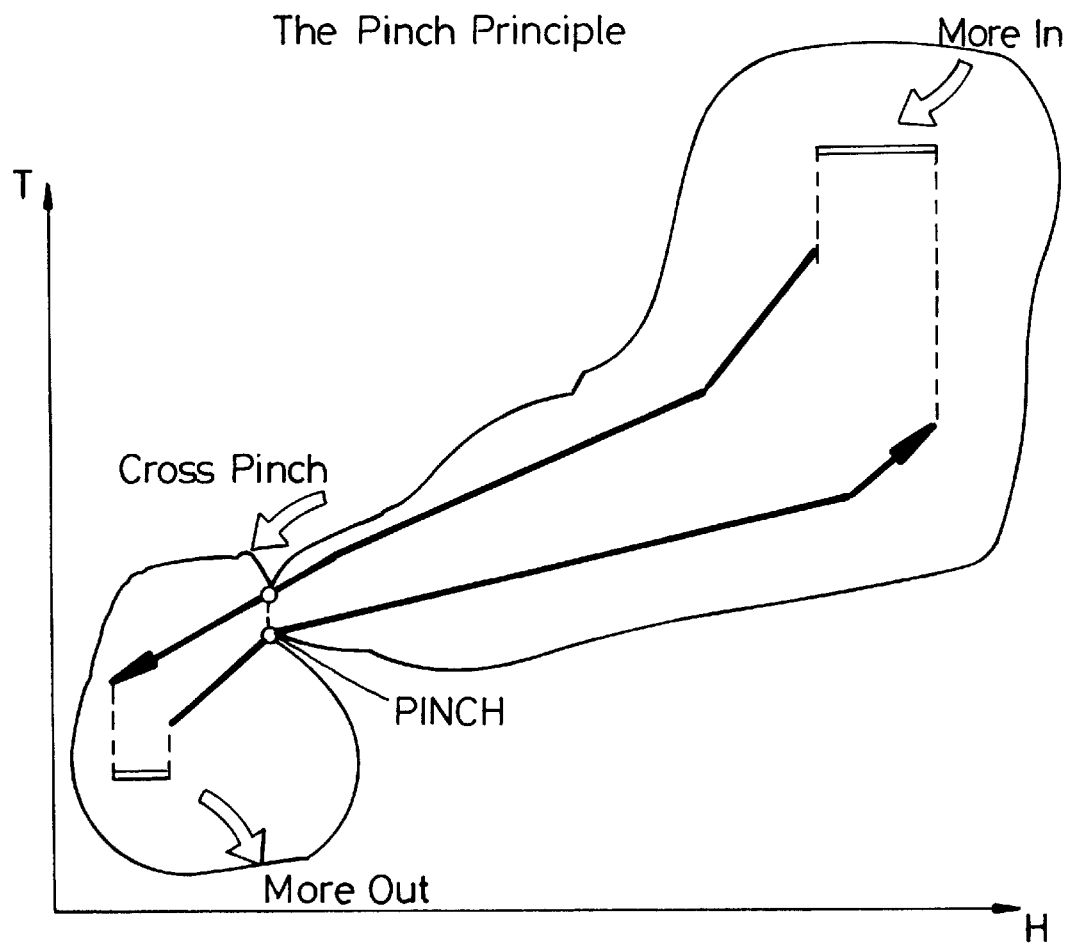
Fig. A4

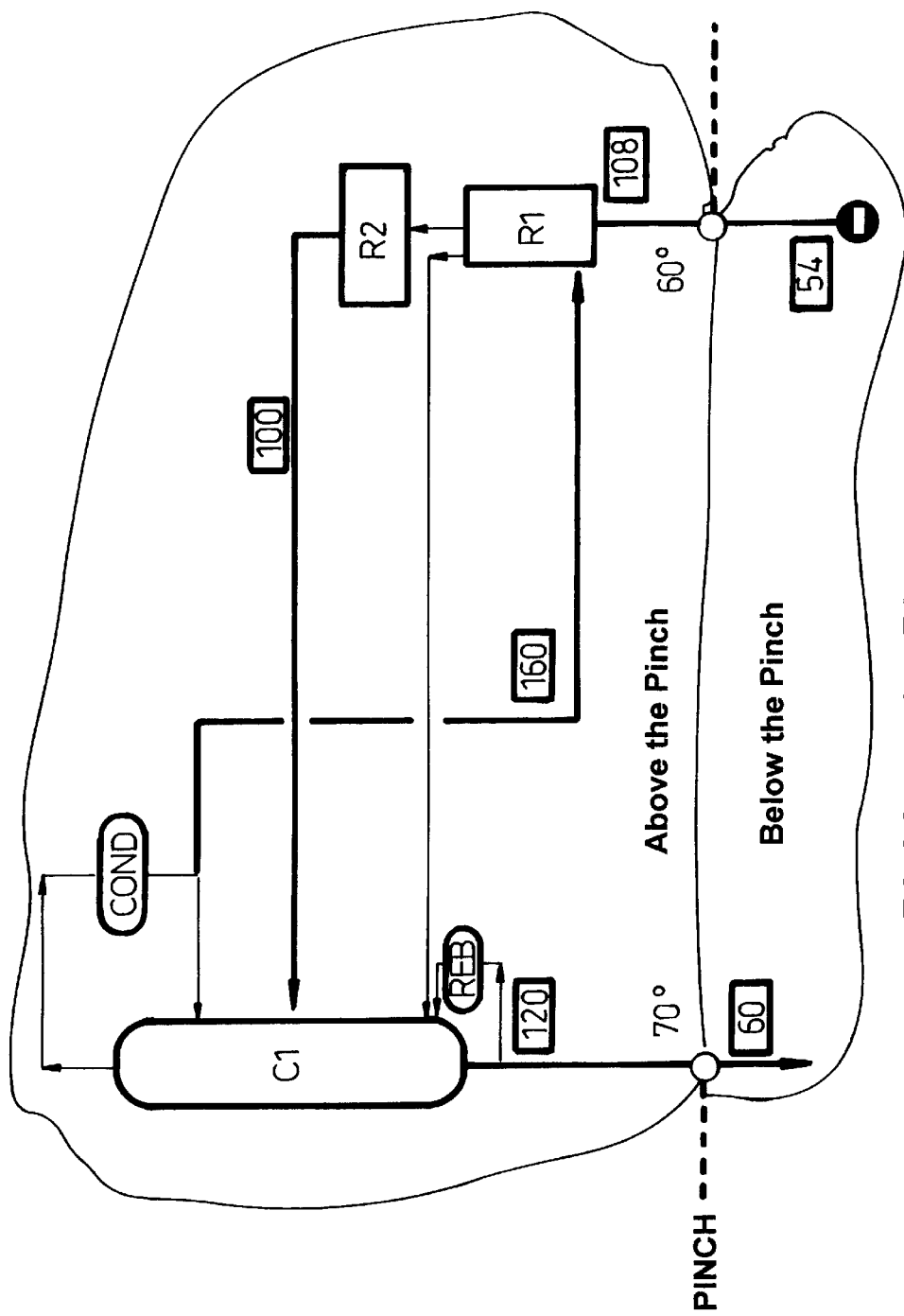
*Fig. A5*

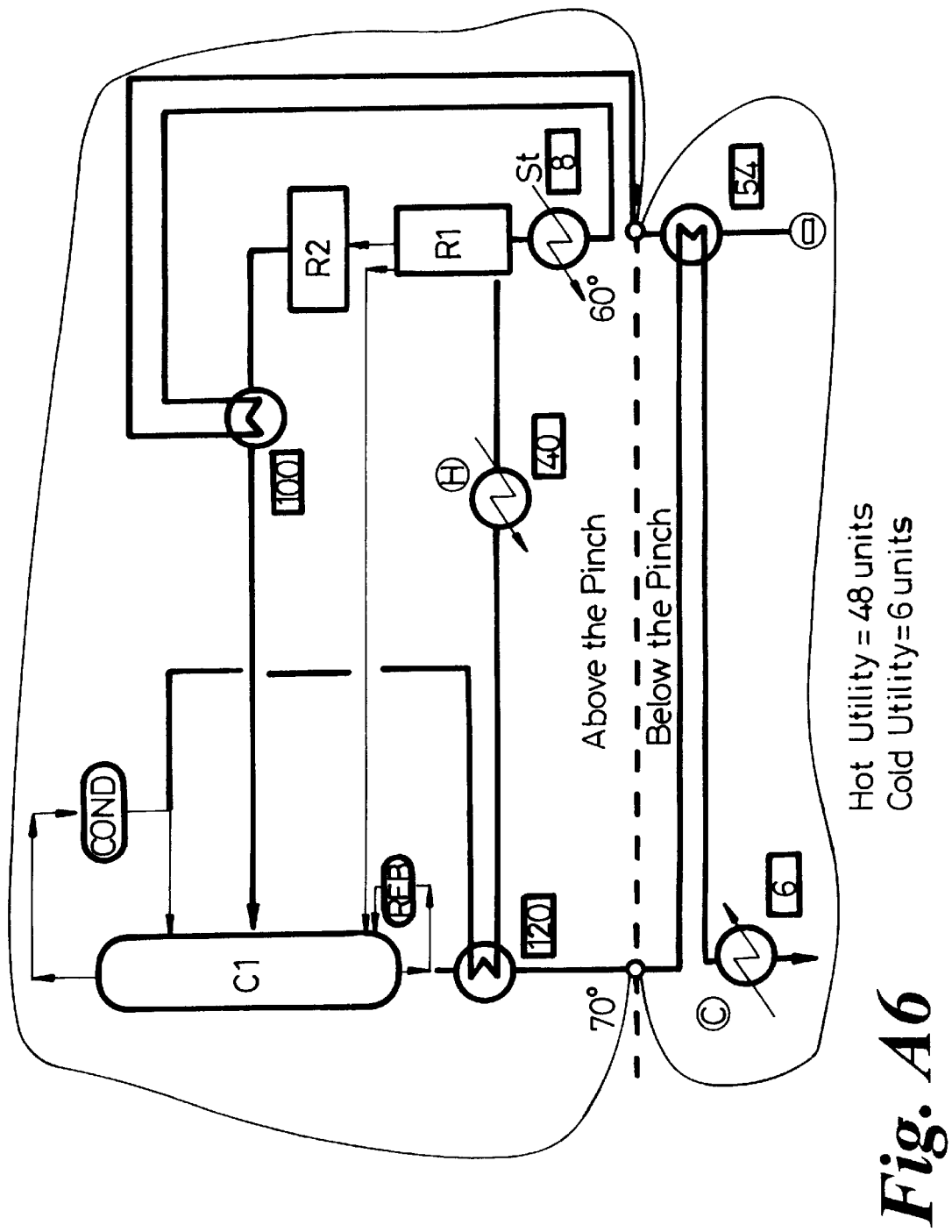
Fig. A6

FLUID EFFICIENCY

This invention relates to methods and means for indicating the efficiency of use of a fluid, and is concerned particularly although not exclusively with minimising waste water in a multi-process unit plant.

In order to describe the current state of the art in waste water minimisation, reference will now be made to FIGS. 1 to 5 of the accompanying diagrammatic drawings, in which.

Figure 4:
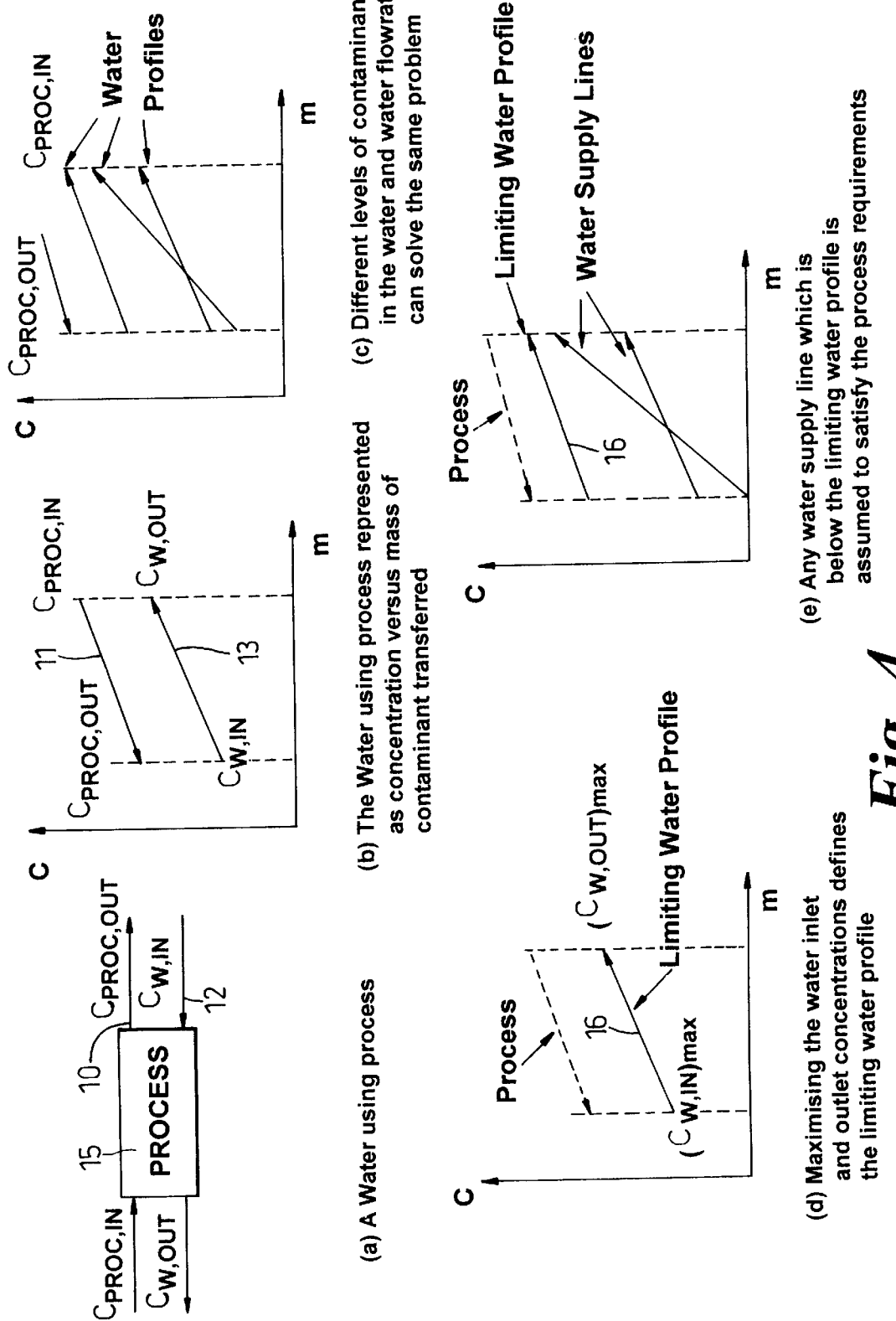
Figure 5:
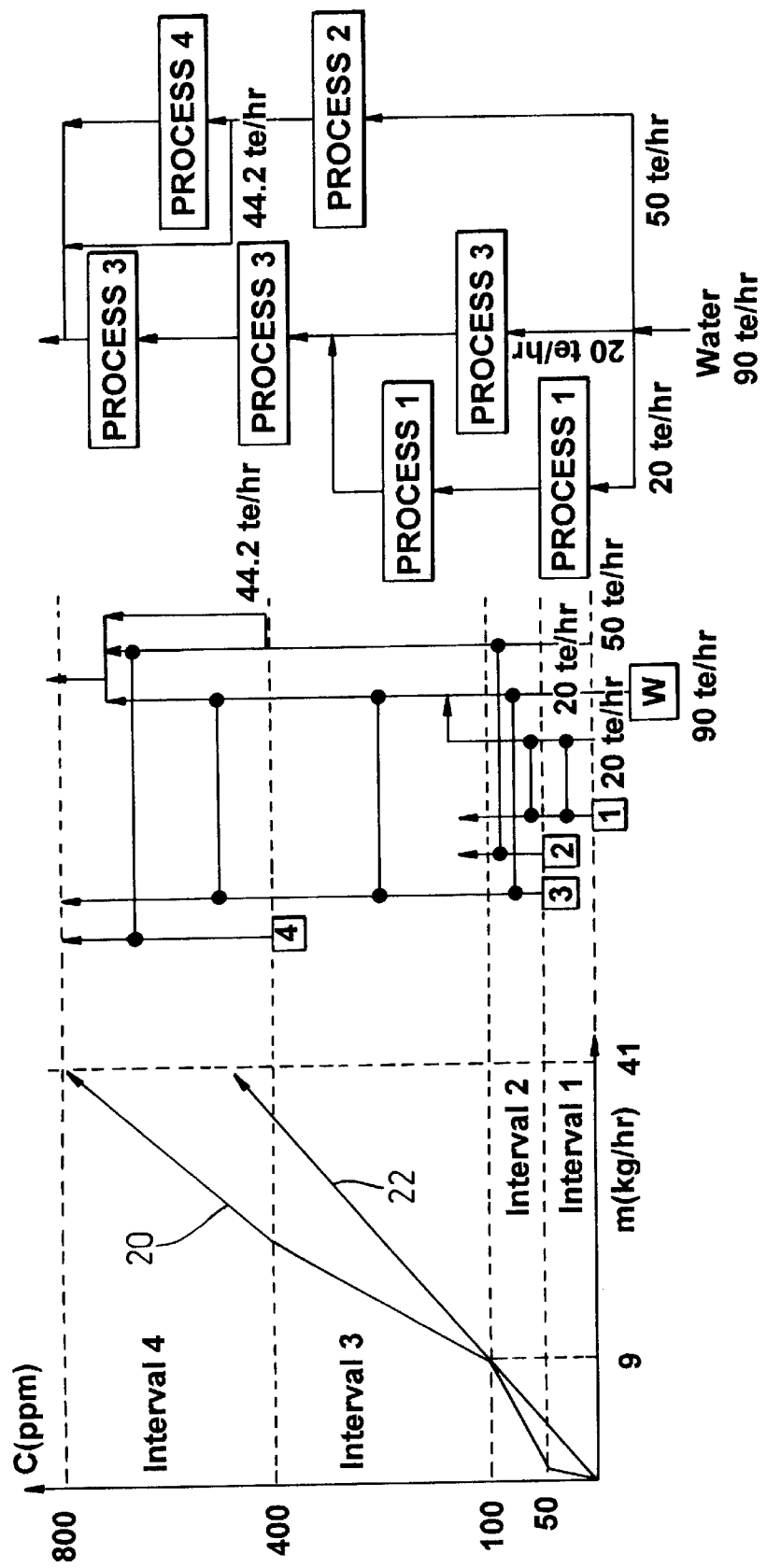

FIGS. 4(a) to 4(e) illustrate a process model that forms a basis of waste water minimisation by current techniques; and FIGS. 5(a) to 5(c) illustrate steps in determining process unit interconnections, by use of the techniques of FIGS. 4(a) to 4(e).

Figure 1:
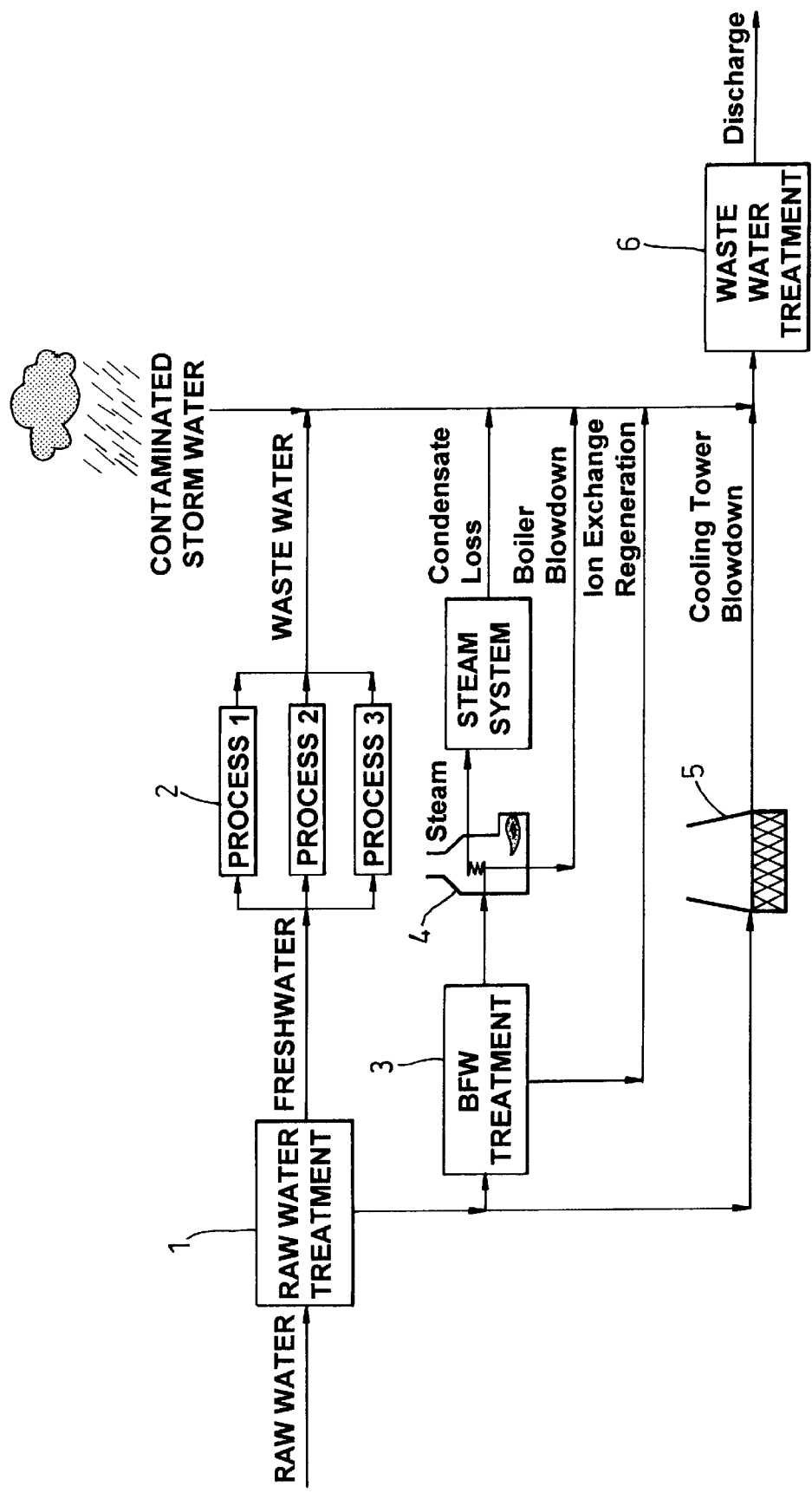
FIG. 1 illustrates water flows in a typical multi-process unit plant.

FIG. 1 illustrates water flows in a typical chemical or processing plant. Incoming raw water is first treated in a raw water treatment facility 1, to provide fresh water. The fresh water is supplied to process units 2, and to utility systems, such as, for example, a boiler 4 (via a boiler fresh water treatment system 3), a cooling tower 5, etc. The waste water from the process units 2 and the utility systems 4,5 is usually mixed and treated in a central waste water treatment system 6, which treats also contaminated stormwater. The treated waste water is then discharged from the waste water treatment system 6.

In order to reduce the overall water demand and the waste water volume for the plant, two main strategies are typically used, among others.

Figure 2:
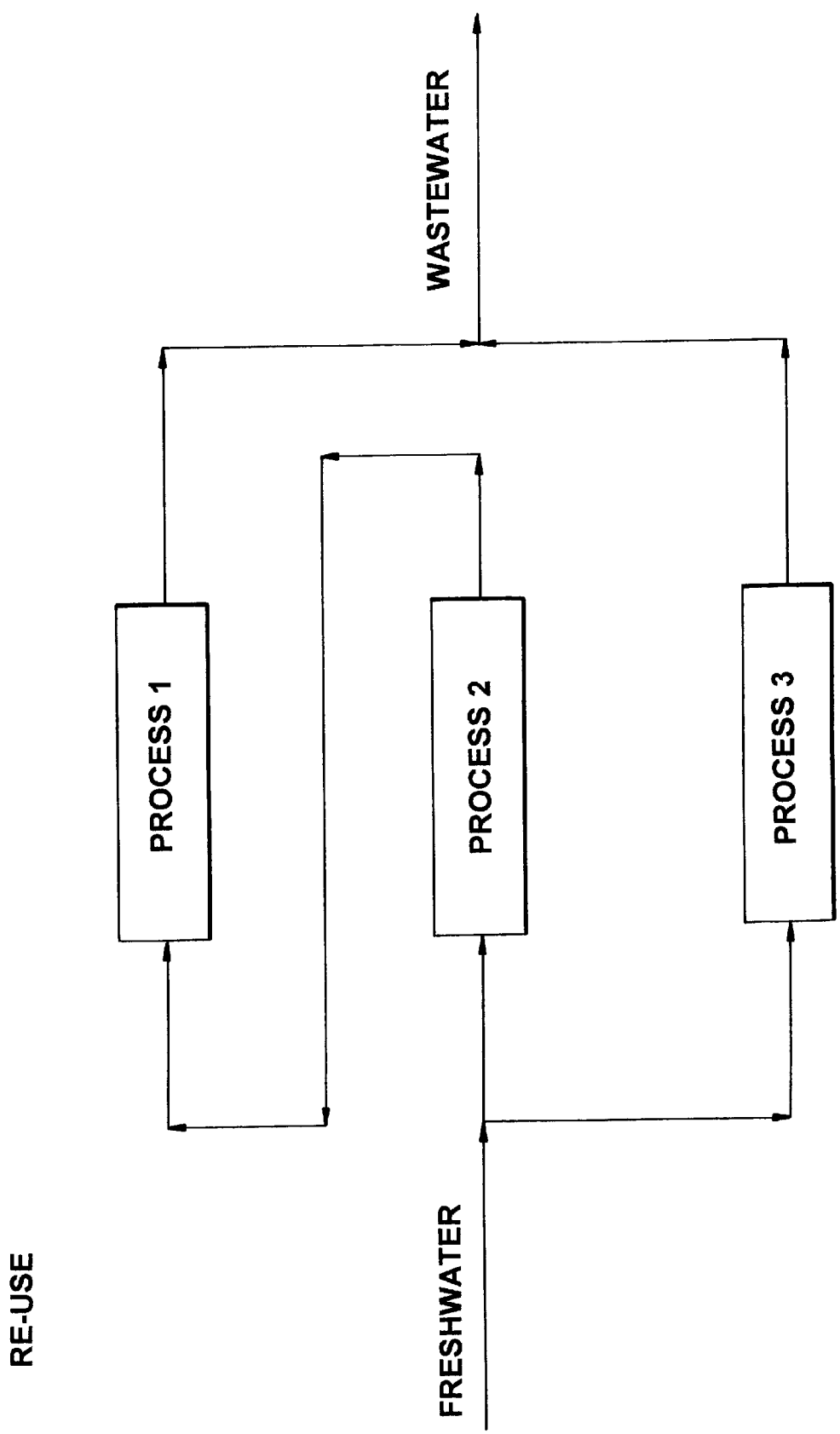
FIG. 2 illustrates a method of reducing fresh water and waste water, by re-use of waste water.

Firstly, there is re-use, as illustrated in FIG. 2. This involves use of waste water from one process unit to satisfy the water demand of other process unit. As shown in FIG. 2, the waste water from Process 2 satisfies the purity requirements for Process 1, and is therefore re-used for Process 1. This re-use reduces the overall water demand and equally reduces the waste water volume. The water from utility waste can also be re-used in process units.

Figure 3:
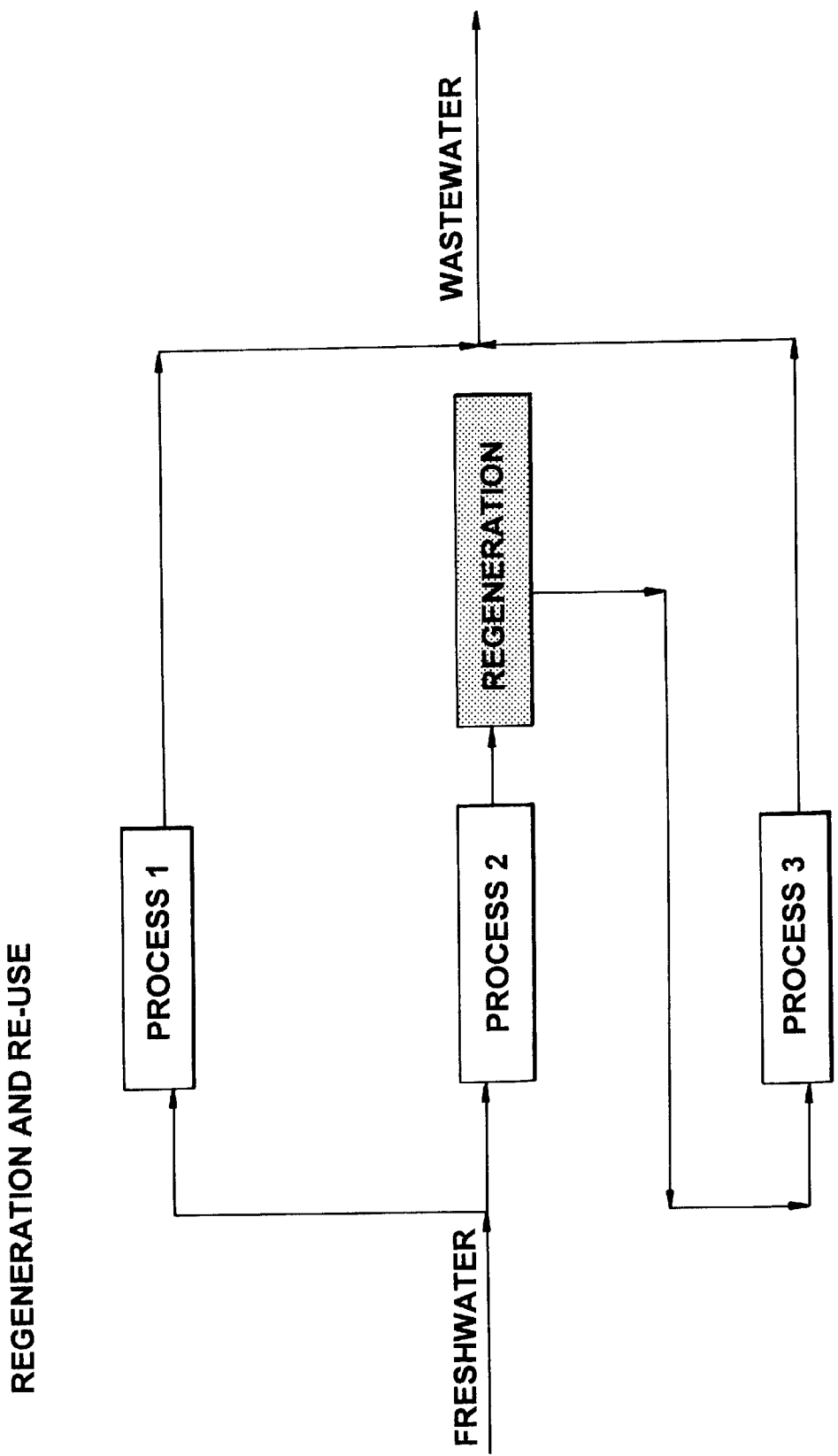
FIG. 3 illustrates a method of reducing fresh water and waste water, by re-generation of waste water.

Secondly, there is re-generation, as illustrated in FIG. 3. This involves part purification of the waste-water from some process units in order that the water may then be re-used to satisfy the demand of the same or other process units in the plant. In FIG. 3, the waste water from Process 2 is re-generated and then used to satisfy the demand for Process 3.

Both re-use and re-generation can be used in a plant, to minimise water demand and waste water. In addition, there are other measures available for reduction in the fresh water and waste water volume. These involve design improvements in the individual process units to minimise their water demand.

Recent techniques for identifying water re-use and regeneration opportunities have been developed by Wang and Smith and have been extensively published [Wang Y P and Smith R, 1994, Waste water Minimisation, Chem Eng Sci, Vol 49, pp 981–1006—and—Smith R, Wang Y P and Patella E, Water and Waste Water Minimisation, Chemical Engineer, May and June 1994].

FIG. 4(a) illustrates a process model for a water-using process 15 that forms a basis for current techniques. The model involves a process stream 10 and a water stream 12. During the process operation, contaminants are transferred from the process stream 10 into the water stream 12. The model is described by a concentration versus contaminant mass flow diagram, as shown in FIG. 4(b). The diagram shows respective profiles 11,13 for the process and the water streams 10,12. Both profiles 11,13 have identical intercepts on the horizontal axis, which represents the mass of contaminant transferred from the process stream 10 to the water stream 12. The diagram represents, in essence, the mass transfer operation within the water-using process.

This process model assumes that the water-using process 15 can operate with different levels of contaminants in the incoming water and with different water flow-rates to achieve the same amount of contaminant transfer, as shown in FIG. 4(c). The model requires a limiting water profile 16 that has maximum inlet and outlet concentrations, as shown in FIG. 4(d). It is then assumed that any water profile below the limiting profile 16 can satisfy the process water requirement and can remove the same amount of contaminant, as illustrated in FIG. 4(e). In practice, this may not be true. For example, in some process operations a reduction in the water flow rate may affect the process performance resulting in reduction in the contaminant transferred. The limiting water profile 16 provides the definition of the process model in the overall water analysis.

After establishing the limiting water profile for the particular water-using equipment, the technique then constructs a "limiting composite curve" 20 for the overall plant, as shown in FIG. 5(a). The limiting composite curve 20 is constructed in a way that is closely analogous to that of thermal composite curves which are constructed in connection with a "pinch analysis/point" technique as developed by Linnhoff et al [Linnhoff et al. *The User Guide for Process Integration for the Efficient Use of Energy,* IChemE, Rugby, 1982]: a summary of this technique is included herein as Appendix A. The fresh water line 22 is then super-imposed against the limiting composite curve 20 to set the minimum fresh water demand for the process, as shown in FIG. 5(a).

In order to develop water networks that provide the minimum water demand, the technique uses a network design methodology analogous to the pinch design method developed by Linnhoff et al [supra]. The development of appropriate practical designs is, however, quite complex. The initial networks obtained tend to have complex structures. For example, one such "design grid" is shown in FIG. 5(b), and the corresponding flowsheet in FIG. 5(c). These complex structures need to be simplified. Known procedures to simplify the complex networks usually involve several trial and error iterations.

The technique explained so far involves only a single contaminant. Typically, industrial operations involve multiple contaminants. The construction of limiting composite curves and the corresponding network design becomes even more complex, to account for multiple contaminants.

Alternatively, a mathematical approach using non-linear programming, which is based on the same process model as illustrated in FIG. 4, has been developed by Rossiter et al [Rossiter A P and Rutkowski M A, *Process Integration for Waste Water Minimisation,* Southern States Annual Environmental Conference, Biloxi, Miss., Oct. 28 1993]. This approach, however, lacks the visualisation element of techniques utilising pinch techniques. The mathematical approach also does not guarantee optimality, due to the non-linearity of the problem.

Problems that can arise from implementing current techniques include the following.

The process model is based on a mass transfer phenomenon. In situations such as reactions, blowdowns, etc, where several water-based streams enter and leave a process unit, it is difficult to build an equivalent mass transfer model. The model cannot explicitly represent water loss (such as evaporation) and water generation (eg via reactions) operations.

The limiting water profile concept may be an impractical definition in many situations. For example, a certain process unit may require a minimum water flow-rate for effective operation—a desalter operation in a crude oil unit requires a certain minimum inflow of water for proper mixing. The assumption that water supply lines below the limiting profile will satisfy the process requirements is not always valid.

The axes used for the graphical representations are concentration versus mass of contaminant. The water flow-rate is an implicit quantity. Thus, implications regarding water flow-rate are not directly visible from the plot. Water flow-rate is represented by the slope of the curves in the plot. Large contaminant flow may have a small water flow associated with it and vice versa. Although water flow-rate is the most important dimension (and its determination the main objective of the exercise), it is difficult to directly visualise this dimension from the plot.

The techniques cannot explicitly address multiple water sources of different purities.

The network configuration cannot be generated directly from the construction of the limiting composite curves. The generation of water network configuration from target mass transfer rates involves complex network design procedure. This needs special expertise in Pinch Technology. Simplification of initial networks involves a complex evolutionary procedure.

In many industrial situations, it may not be possible to specify exact limiting concentrations and water flow-rate values, but it may be possible to indicate estimates for inlet and outlet concentrations and water flows in and out of the unit. These estimates may not be consistent with each other in terms of contaminant balance. In such cases, again, there will be difficulty in representing the process in the form of a limiting water profile.

Beyond the application of Pinch Technology principles for setting the network configuration, the limiting composite curves do not directly suggest ideas for mixing and re-use of water.

Most industrial applications involve multiple contaminants in the water network. The extension of a design algorithm to identify minimum water demand becomes quite complex in the multiple contaminant case. In addition, the procedure involves artificially shifting the composition of a reference contaminant to account for limitations created by other contaminants. The limiting composite curves therefore do not directly show compositions of the majority of contaminants.

The multicomponent case significantly increases the complexity of the procedure in order to develop the network configuration that achieves the minimum water demand.

In the case of multiple contaminants, the model requires a certain definition of relationship between masses of contaminants transferred. If the particular operation does not involve a "mass transfer" operation, such an assumption would create inaccuracies in the model.

Preferred embodiments of the present invention aim to provide methods and means for minimising waste water, which may be improved in one or more of the foregoing respects.

According to one aspect of the present invention, there is provided a method of indicating efficiency of use of a fluid in a multi-process unit plant, comprising the steps of:
  a. for each process unit, determining the required input and output of said fluid, in terms of both purity and flow-rate of the fluid;
  b. representing in a graphical or tabular form all of said inputs and outputs of all of said process units, in terms of both purity and flow-rate of the fluid; and
  c. indicating by said graphical or tabular representation said efficiency of use of said fluid.

A method as above may include the further stop of deriving from said graphical or tabular representation connections between said process units to increase re-use of said fluid between said process units.

A method as above may include the further step of deriving from said graphical or tabular representation connections between said process units for re-generation of said fluid between said process units.

According to another aspect of the present invention, there is provided a method of increasing efficiency of use of a fluid in a multi-process unit plant, comprising the steps of deriving connections between said process units by a method according to either of the two preceding aspects of the invention, and then effecting those connections between said process units.

Preferably, said fluid comprises water.

According to a further aspect of the present invention, there is provided a method of representing use of a fluid in a multi-process unit plant, comprising the steps of:
  a. for each process unit, determining the required input and output of said fluid, in terms of both purity and flow-rate of the fluid; and
  b. representing in a graphical or tabular form all of said inputs and outputs of all of said process units, in terms of both purity and flow-rate of the fluid.

According to another aspect of the present invention, there is provided a device for indicating efficiency of use of a fluid in a multi-process unit plant, the device comprising:
  means for receiving, for each process unit, data defining the required input and output of said fluid, in terms of both purity and flow-rate of the fluid; and
  means for representing in a graphical or tabular form all of said inputs and outputs of all of said process units, in terms of both purity and flow-rate of the fluid, and for indicating by said graphical or tabular representation said efficiency of use of said fluid.

Figure 6:
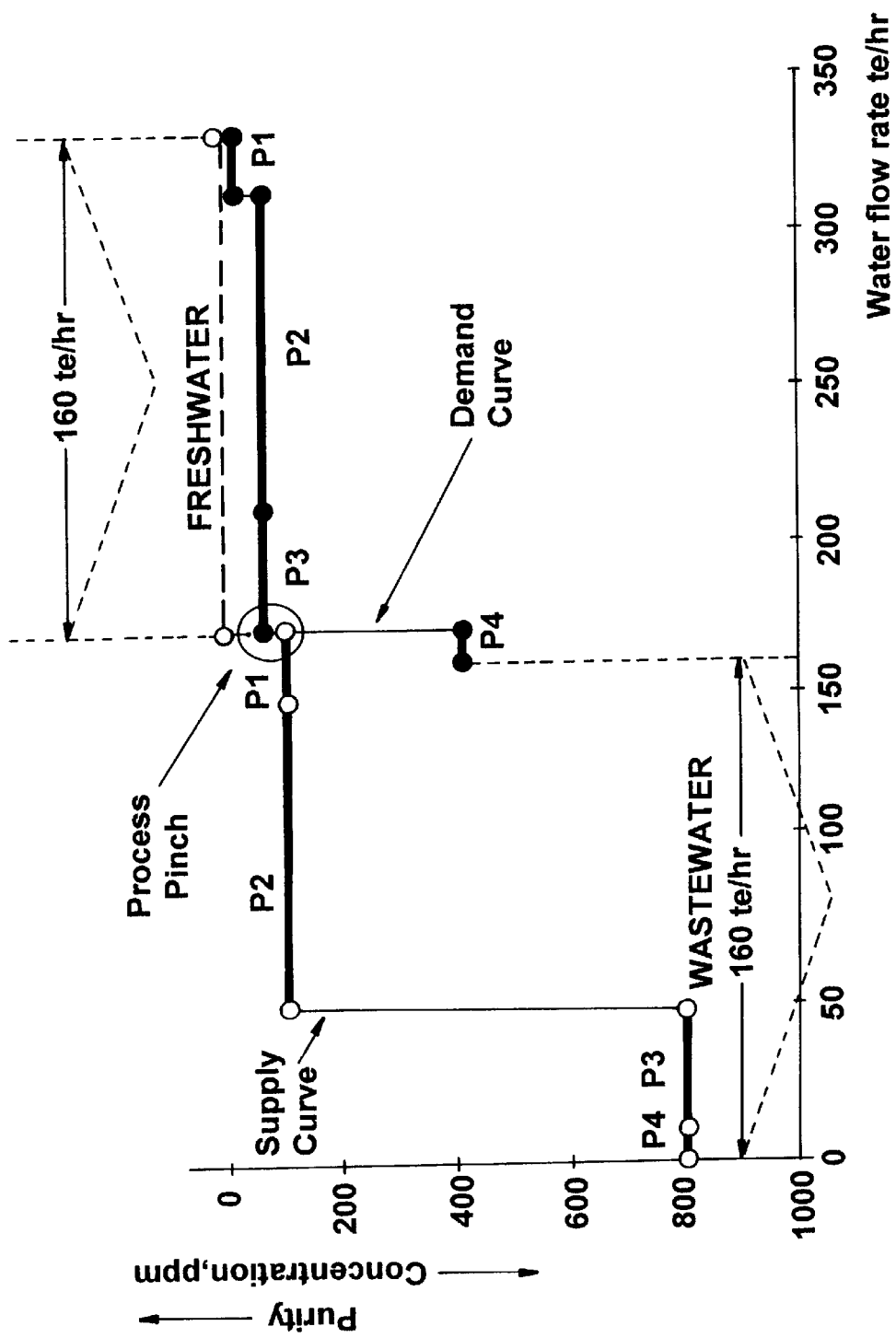
Figure 7:
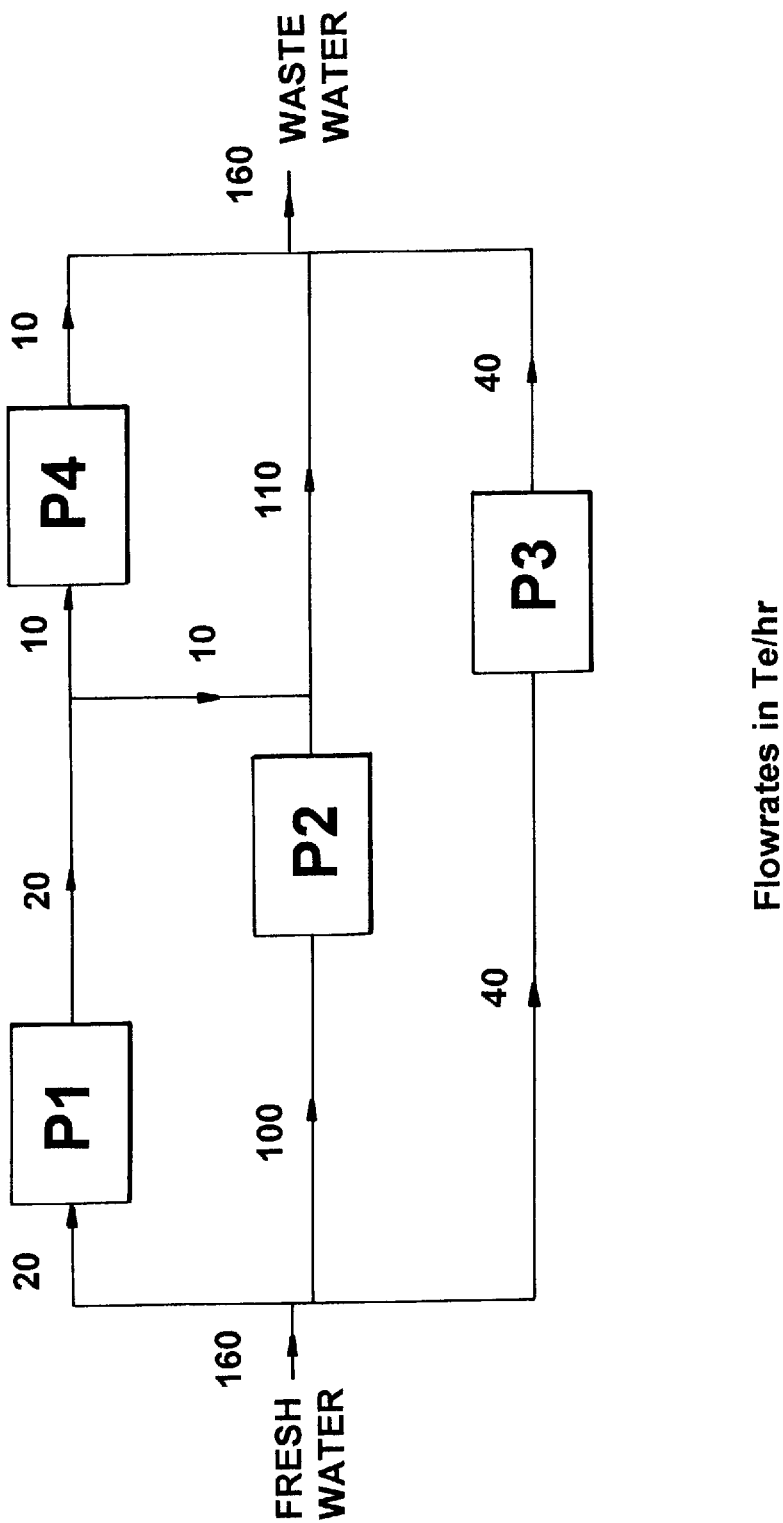
Figure 8:
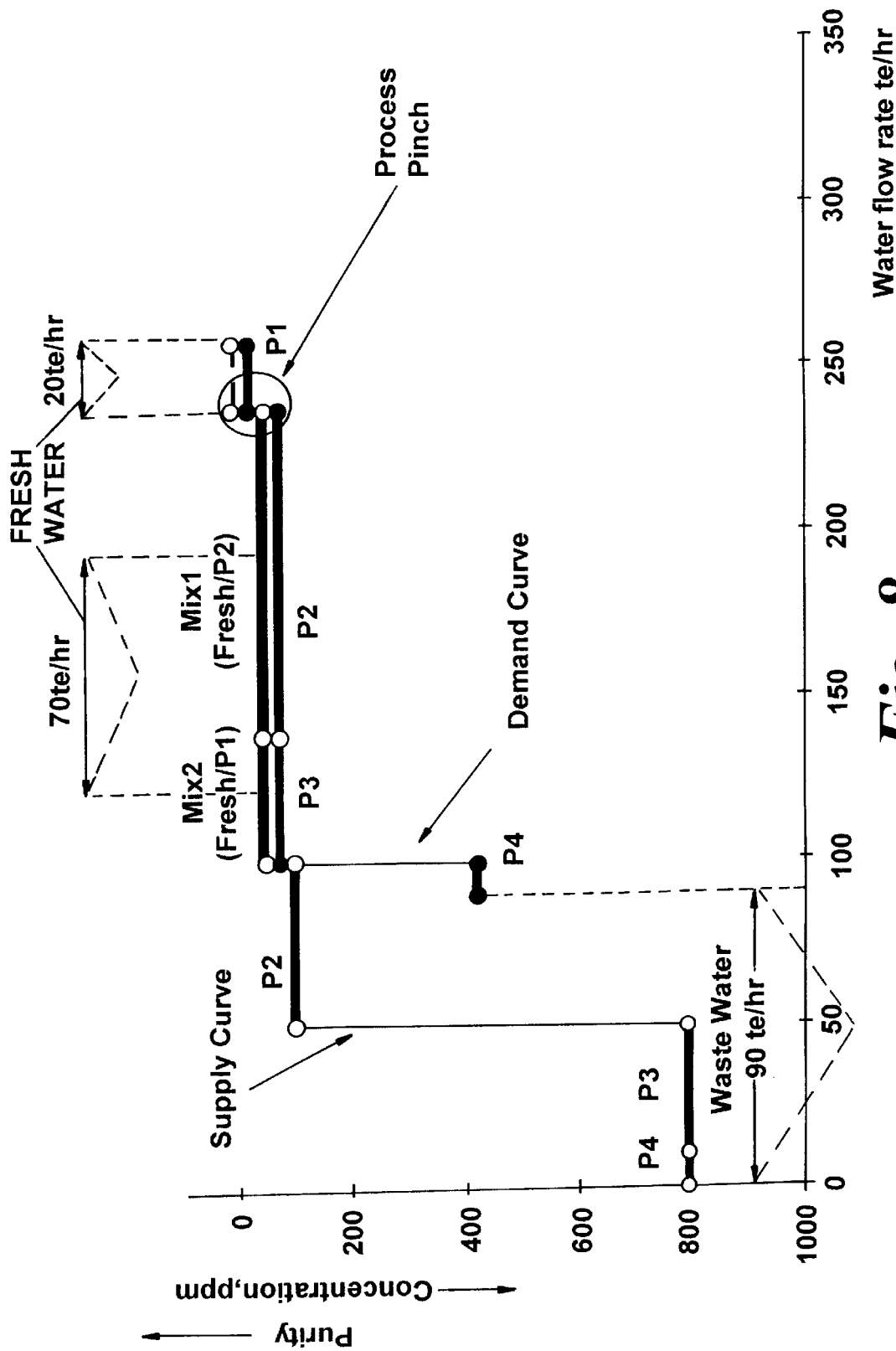
Figure 9:
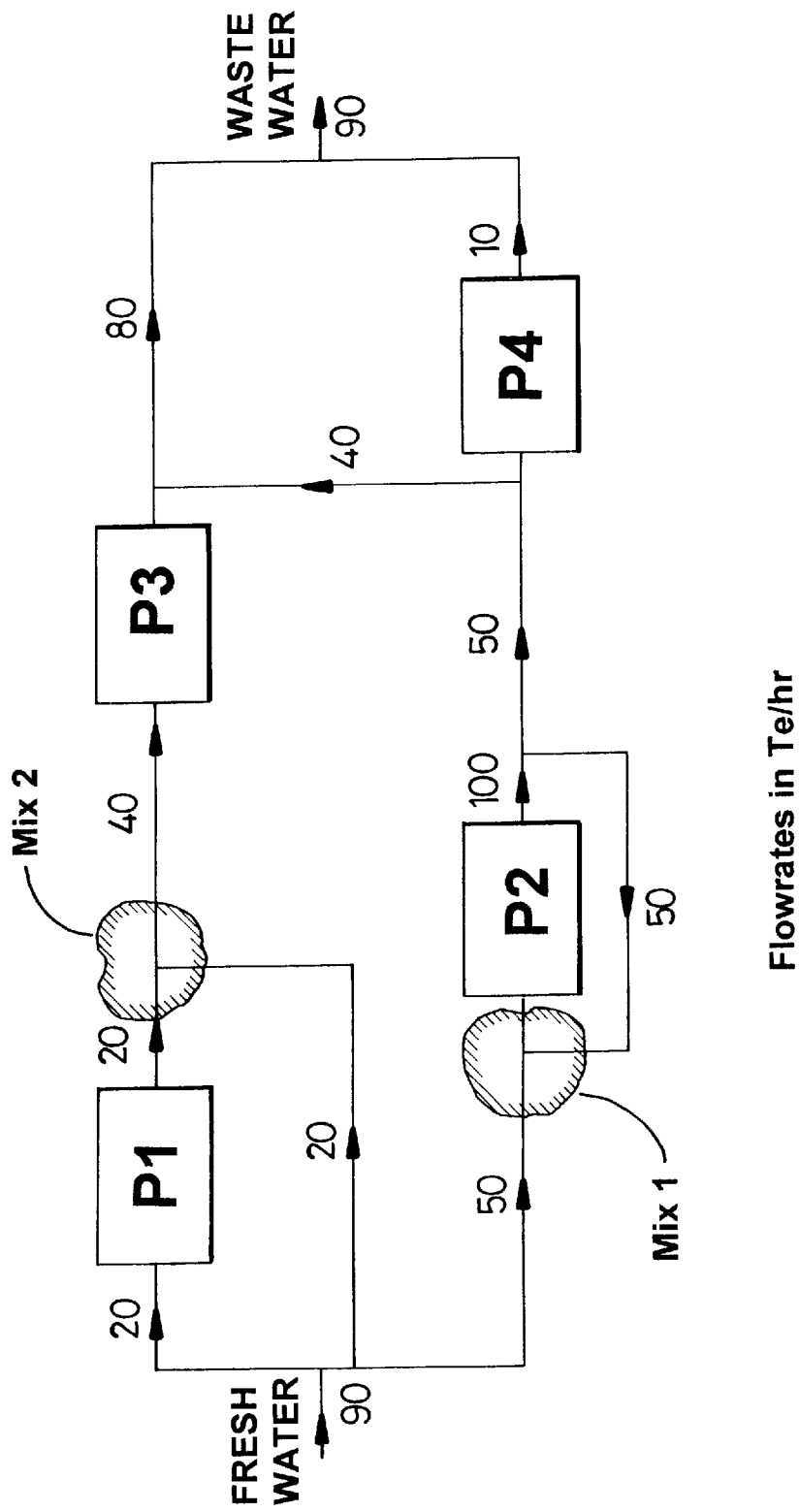
Figure 12:
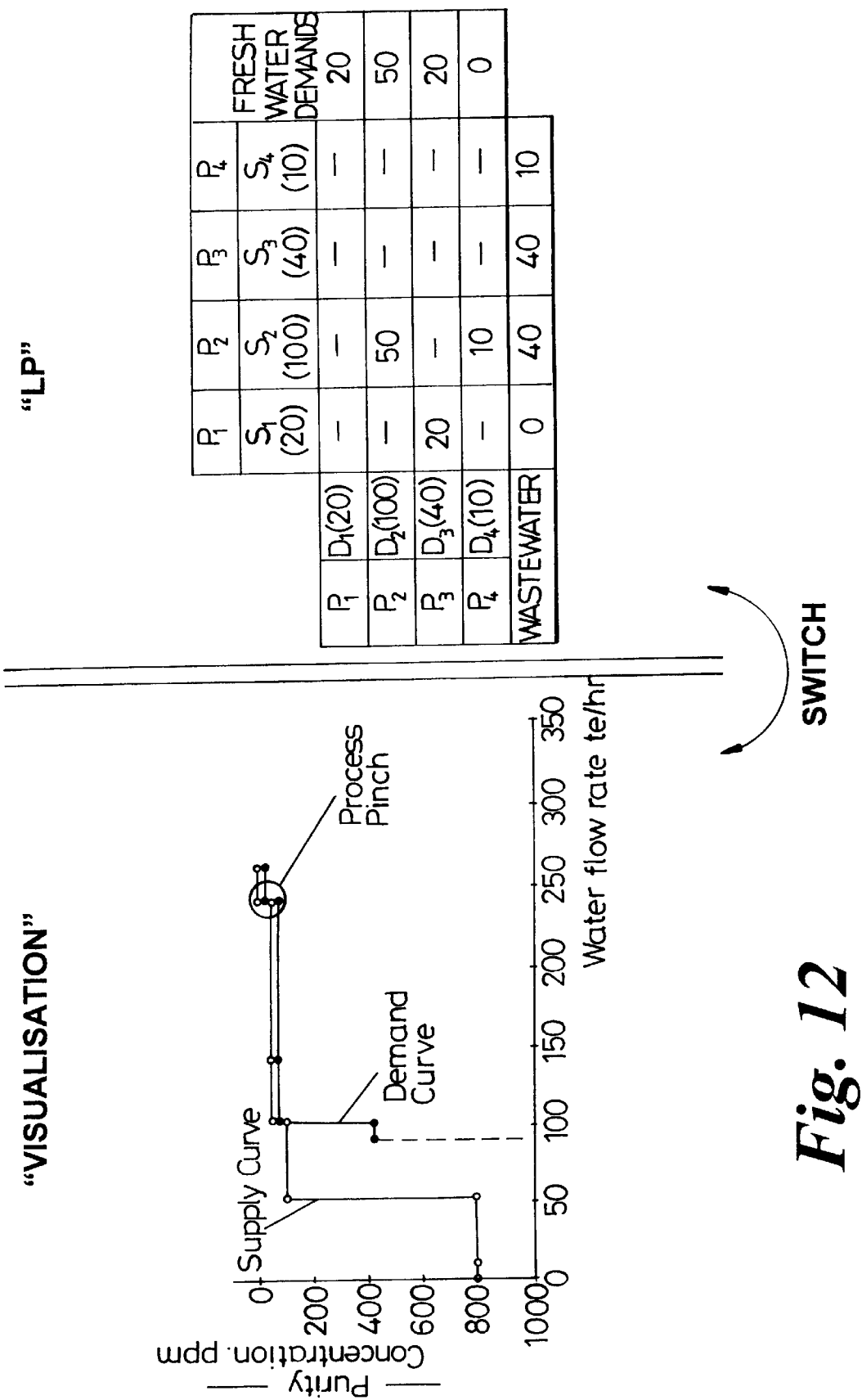
Figure 13:
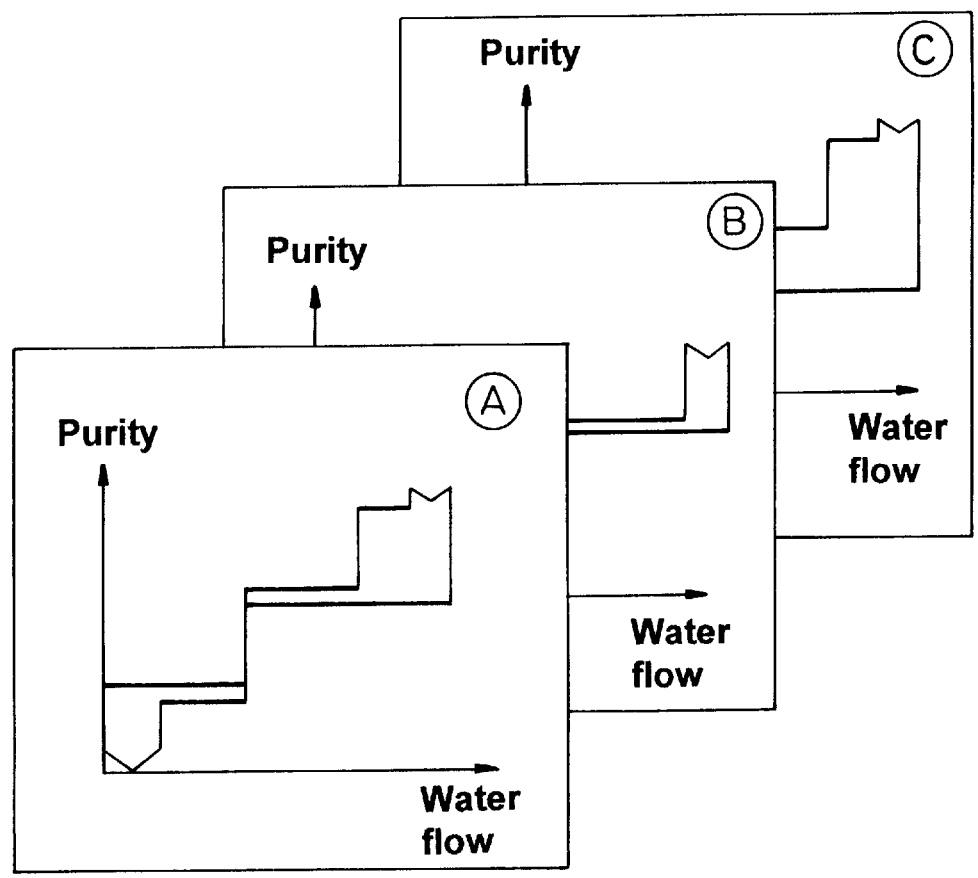
Figure 15:
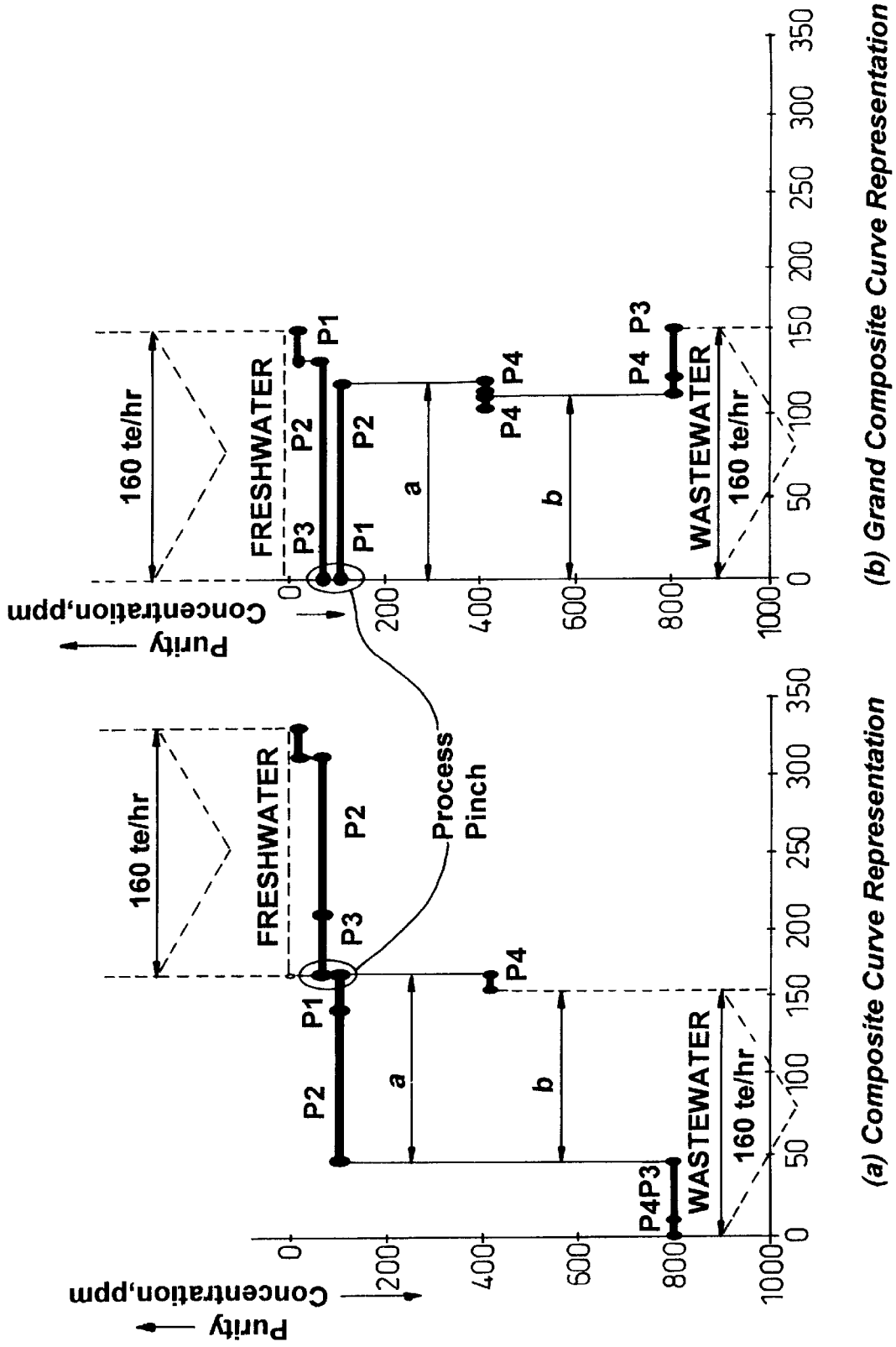
Figure 16:
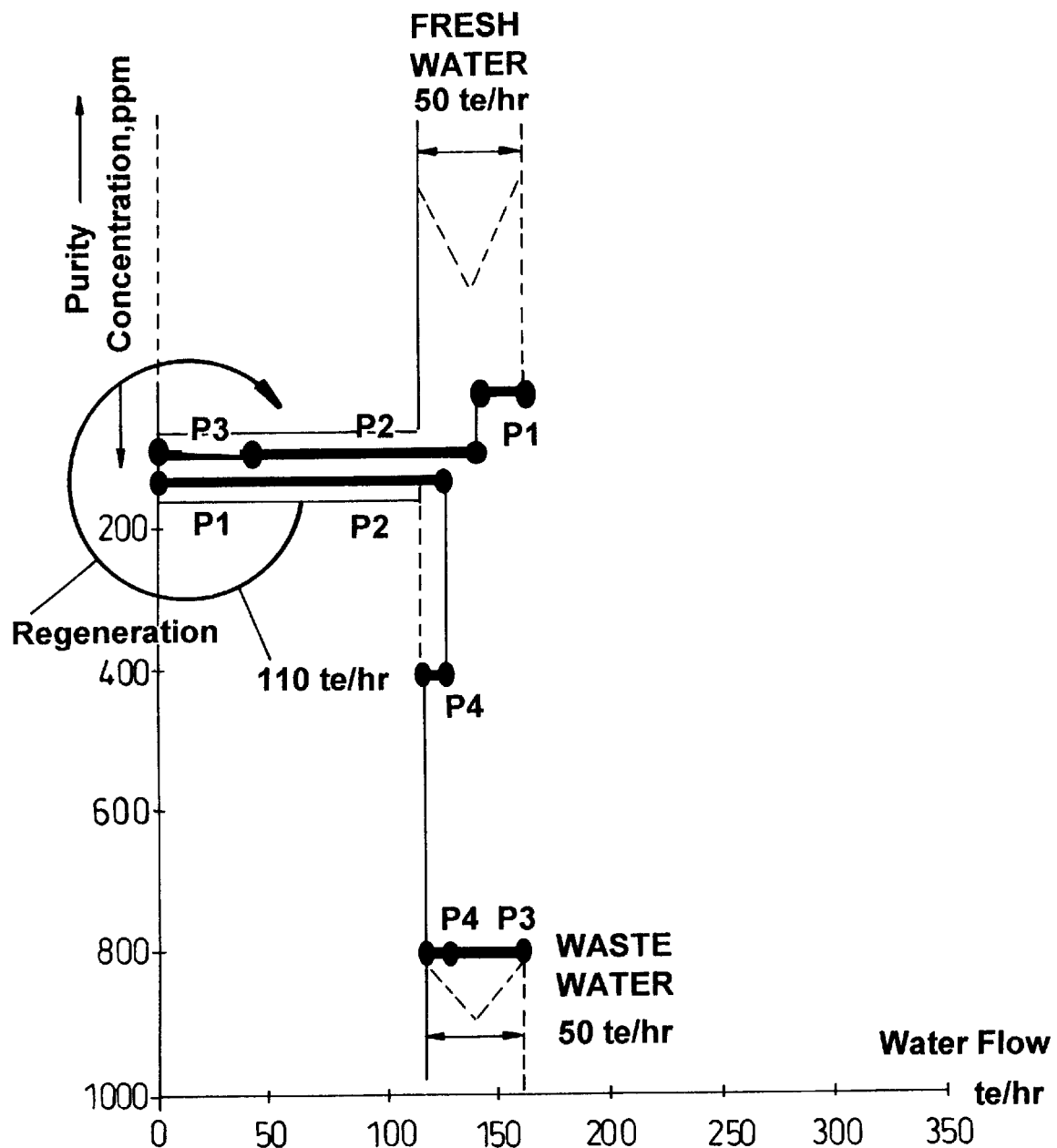
Figure 17:
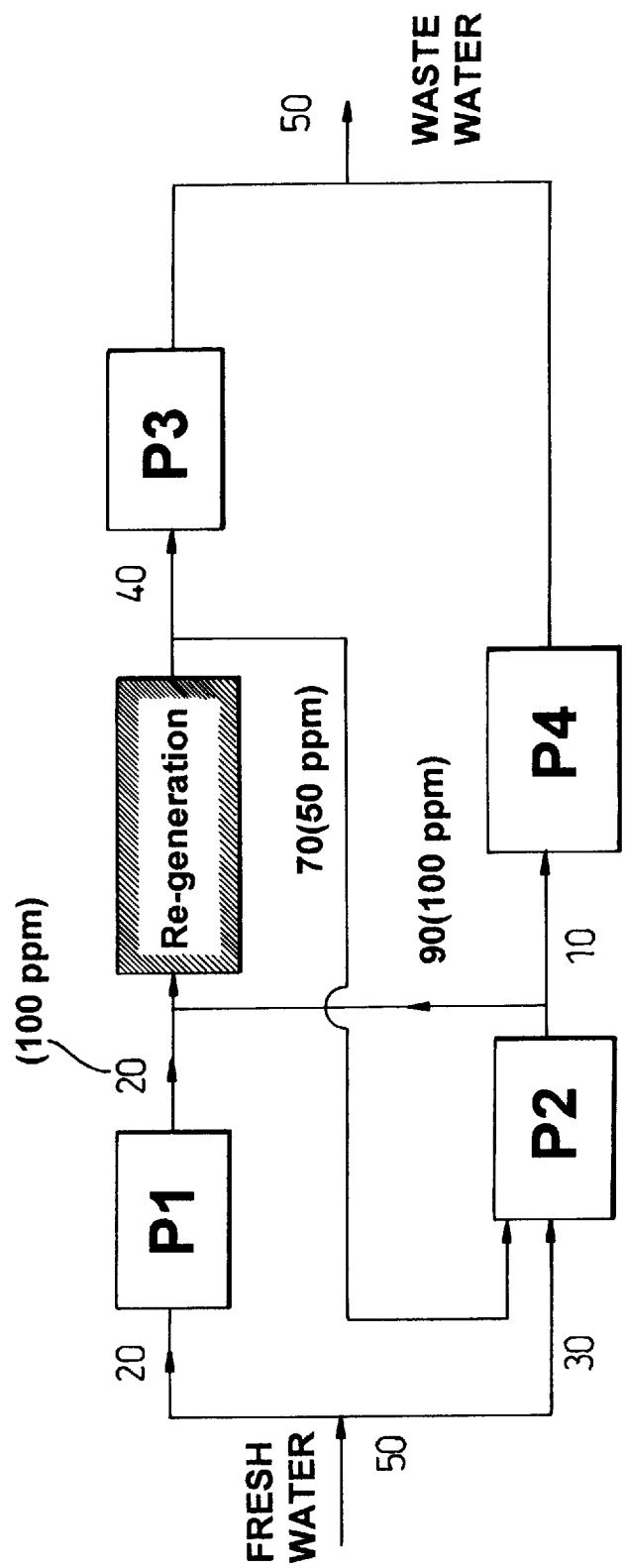

For a better understanding of the invention, and to show how embodiments of the same may be carried into effect, reference will now be made, by way of example, to FIGS. 6 to 18 of the accompanying diagrammatic drawings, in which:

FIG. 6 (composite curves for initial design without mixing) illustrates graphically water sources and demands in a multi-process unit plant, in terms of required purity and water flow for each process unit;

FIG. 7 (process flow sheet for initial design without mixing) is a flowsheet illustrating the processes of FIG. 6 and their water interconnections;

FIG. 8 (composite curves for design after mixing of water streams) is a graph similar to FIG. 6, but showing a modification by mixing water sources;

FIG. 9 (process flow sheet for design after mixing of water streams) is a flowsheet illustrating the processes of FIG. 8 and their water interconnections;

FIG. 10 (equivalent linear programming formulation) illustrates a Linear Programming (LP) formulation that is an alternative to graphical representations as in FIGS. 6 and 8;

FIG. 11 (LP representation of design after allowing for water mixing) illustrates the Linear Programming solution that is an alternative to the graphical representation as in FIG. 8;

FIG. 12 (graphical visualization and LP are fully compatible) illustrates a combined use of linear programming and pinch visualisation;

FIG. 13 (graphical visualization for multi-component systems) illustrates a representation of a multiple contaminant visualisation;

FIG. 14 (overall design procedure) summarises design procedures in waste water minimisation, in accordance with preferred embodiments of the invention;

FIG. 15 illustrates the construction of a Grand Composite Curve, to facilitate identification of regeneration opportunities;

FIG. 16 (using the grand composite representation to identify regeneration opportunities) illustrates one possible re-generation opportunity, from the Grand Composite Curve of FIG. 15;

FIG. 17 (process configuration involving regeneration from 100 ppm to 50 ppm) is a flow scheme to illustrate process connections relating to the curve of FIG. 16; and FIGS. 18($a$) and 18($b$) show respectively a flowchart to illustrate key steps in a preferred process, and apparatus for carrying out some of the steps.

The new representation of FIG. 6 utilises purity (or concentration) as a vertical axis and water flow-rate as a horizontal axis. Each water-related process unit can be considered as having water streams as inputs and outputs. The water streams that are the inputs to the unit provide the water demands of the unit. The water demands of all of the water-related units are plotted in a "demand composite" form to define a Demand Curve, as shown in FIG. 6. Similarly, the water output streams of a process unit are treated as the water sources of the unit, and a "source composite" Supply Curve can be constructed from the output streams from all of the water-related units in the process. The construction of the demand and the source composites is similar to the composite curve construction of Linnhoff et al [supra]. An important feature of FIG. 6 is the choice of units for the axes, which gives a surprisingly practical result in indicating the efficiency of water use, leading to direct implementation of interconnections between units, as will be described in more detail below.

To illustrate the application of this new approach, a numerical example from Wang and Smith [supra] is taken.

The plant includes four process units P1 to P4 that consume water and discharge contaminated waste water as summarised in Table 1 below.

TABLE 1

| Process Number | Contaminant Mass Load (kg/hr) | Cin (ppm) | Cout (ppm) | Water Flow-rate (te/hr) |
|---|---|---|---|---|
| P1 | 2 | 0 | 100 | 20 |
| P2 | 5 | 50 | 100 | 100 |
| P3 | 30 | 50 | 800 | 40 |
| P4 | 4 | 400 | 800 | 10 |

In this example, only one contaminant is considered. The processes P1 to P4 have maximum inlet and outlet concentrations that can be tolerated (Cin and Cout), together with a water flowrate requirement. The mass transfer rate of the contaminant is indicated in Table 1, but is not plotted directly in FIG. 6.

In FIG. 6, the water sources of process units P1 to P4 are plotted to form the supply curves by starting with the sources of lowest purity, which are P4 and P3, at a concentration of 800 ppm. Each process is represented by a horizontal line which is drawn at 800 on the y-axis, and extends along the x-axis for an amount corresponding to the flowrate of the process—10 for P4 and 40 for P3. Then, the water sources of next highest purity are drawn in a similar manner. Thus, the water sources for P2 and P1 extend for respective distances (100 and 20) along the x-axis, at a concentration of 100 ppm.

The demand curve is drawn in an analogous manner for the respective water inputs—concentrations of 400 for P4, 50 for P3 and P2, and 0 for P1.

The demand curve is butted up to the supply curve as far as possible, without crossing of the curves. The abutment point of the two curves is the "pinch point" of the multi-process unit plant.

It may be immediately seen from FIG. 6 that the waste water source from process P1 can satisfy the water demands of process P4. The demand curve of process P4 is located below the supply curve of process P1, which is of higher purity. All other water demands of processes P1 to P3 require higher purity water than is available from all of the sources of processes P1 to P4.

The illustration of FIG. 6 translates immediately into the water pipework interconnection illustrated in the flowsheet of FIG. 7, where the connections between the processes P1 to P4 can be clearly seen, including the supply of process P4 by part of the waste water output of process P1.

This re-use of part of the output of process P1 reduces the total fresh water requirement of 170 te/hr to 160 te/hr, by a simple pipe connection, irrespective of the processes inside the units P1 to P4. The waste water output is similarly reduced from 170 to 160 te/hr. The figure of 170 te/hr is arrived at by simply summing the water flow-rate requirements of all of the processes P1 to P4.

Thus, in FIG. 6, the water source and the water demand composites are overlapped, without crossing of the curves.

The overlap indicates the scope for water re-use between sources and demands within the multi-process plant without mixing of any of the water streams of different concentrations. The available overlap or re-use is limited by the "pinch point" between the source composite and the demand composite. The representation in FIG. 6 also identifies minimum fresh water demand and minimum waste water requirements after maximum re-use of water—without mixing of water streams at different concentration levels. The pinch visualisation representation in FIG. 6 also illustrates the overall water balance within the plant. The visualisation also identifies the respective source streams that need to be supplied to the specific water demanding units in order to maximise the water re-use. In other words, the representation not only sets minimum water consumption targets but also provides specific design guidelines to achieve the maximum re-use of water.

The model does not require any specific relationship between the flows, concentrations or the number of the input streams and the output streams.

The implementation illustrated in FIGS. 6 and 7 can be improved by mixing of water streams at different concentration levels. In particular, attention is given to the water streams adjacent the "pinch region". In this case, it may be seen that the source curves of processes P2 and P1 are quite close in concentration (100 ppm) to that (50 ppm) of the demand curves of processes P3 and P2.

FIG. 8 shows the source and demand composites after appropriate mixing of water streams. By mixing 50% of the water output of P2 with fresh water to give a Mix1, and 100% of the waste water output of process P1 with fresh water to give a Mix2, all of the water demands of processes P2 and P3 can be met.

In summary, therefore, the two stream mixes are as follows:

Mix 1:
- 50 te/hr Fresh water
- 50 te/hr P2 outlet
- Resulting contaminant concentration 50 ppm Mix 2:
- 20 te/hr Fresh water
- 20 te/hr P1 outlet
- Resulting contaminant concentration 50 ppm This implementation is illustrated in FIG. 8. The process pinch point has moved almost completely to the right. The waste water requirement (and corresponding fresh water requirement) has been reduced to 90 te/hr. This provides the minimum fresh water demand and maximum re-use of water after allowing mixing of water streams at different concentrations.

The pipework interconnections that result from the design requirements illustrated in FIG. 8 are shown in FIG. 9. As in FIG. 7, all of the necessary flowrates and connections between the process units P1 to P4 can be seen, corresponding to the composite curves indicated in FIG. 8.

Thus, FIG. 8 illustrates a possibility of increasing water re-use by mixing of two source streams close to the "pinch". The mixing results in a water stream of intermediate concentrate on which relieves the existing "pinch" and provides an opportunity of increasing the water re-use. The respective design decisions can be easily identified. The new visual representation therefore also provides direct guidelines for the specific design actions that could be taken to minimise the fresh water demand.

The pinch visualisation representations of FIGS. 6 and 8 can be plotted in most optimistic, actual or most conservative operation mode or any other basis. The definitions of these conditions are slightly different to those assumed by Wang and Smith [supra]. By the most optimistic condition we imply "dirtiest" water inputs and "cleanest" water outputs from the units with "minimum" water flow-rates for the inputs and the outputs. Actual condition implies existing concentration and flows as in current plant operation. The most conservative case implies the opposite of the limiting case, i.e. the cleanest water inputs to the unit and the dirtiest water outputs with the largest practical assumption regarding their flows. The designer can also consider any other basis for the model. The targets will correspond to the basis that has been chosen. The pinch visualisation therefore has the flexibility to choose any of the bases. In practice the choice of the bases may depend on the type of the application. The visualisations as shown in FIGS. 6 and 8 can also be plotted with purity or concentration (in any units) and flows (in any units) on any related axes without any loss of generality. The choice of the axes (vertical versus horizontal) can also be changed without any loss of generality.

As an alternative to representation in a graphical manner as shown in FIGS. 6 and 8, flowrates and purities (or concentrations) may be depicted in an equivalent Linear Programming (LP) formulation.

FIG. 10 illustrates a Linear Programming formulation that emulates a representation of the type shown in FIGS. 6 and 8. The formulation is represented in a generic format so as to clarify the key aspects of the LP algorithm. The dimension of the problem and the numerical values correspond to the example problem from FIGS. 6 and 8. The horizontal row (S1, S2 etc.) indicates various water sources that are available from water-related process units within a plant. The vertical column (D1, D2 etc.) indicates the water demands of the units. Each value within square brackets indicates the supply or demand in terms of water-flow rates.

The numerical values of $SD_{ij}$ as shown within the matrix indicate the water that is re-used between source i and demand j.

The objective function of the LP algorithm can be formulated as minimisation of fresh water flow rates or waste water-flow rates $$\left( \text{ie. Min} \sum_j F_j \text{ or Min} \sum_i W_i \right).$$

Alternatively the objective function can be formulated on cost basis, for example, minimisation of freshwater and wastewater costs $$\left( \text{ie Min} \left[ \sum_j FCost_j * F_j + \sum_i WCost_i * W_i \right] \right).$$

The LP formulation also includes equations describing water balances such as shown in FIG. 10. The water demands ($D_1$) are partly or fully satisfied by the water outputs from process (internal sources $SD_{ij}$), the remaining demands being satisfied by fresh water. The water supplies ($S_1$) are partly or fully consumed to satisfy the
P40135US—Specification as faxed to USA—10 Jan. 1996
DIBB LUPTON BROOMHEAD The result front the linear programming formulation such as shown in FIG. 10 also provides a specific design solution for the minimum fresh water and waste water flows. To summarise, the linear programming approach as illustrated in FIG. 10 is easy to implement, provides rigorous solutions, guarantees optimality and is flexible water demands, the remaining being sent for wastewater treatment ($W_i$).

In addition to the water balance constraints, the LP formulation also includes concentration constraints as shown in FIG. 10. The concentration constraints ensure that the inlet contamination concentration is less or equal to the specified contaminant concentration ($CD_j$) for demand ($D_j$).

The formulation described in FIG. 10 can be readily processed by standard LP algorithms. The LP formulations guarantee optimality of solutions.

The formulation can also easily incorporate consideration for multiple components without any loss of generality and again guarantee optimality. It can also easily consider specific models for pick-up of the contaminants which could relate input streams with the output streams of the unit. The linear programming formulation can also easily incorporate consideration of re-generation or water purification opportunities to minimise water usage. Practical constraints relating to forbidding or enforcing a match between a given supply ($S_i$) and a given demand ($D_j$) can also be easily incorporated in the LP algorithm. The level of investment required in re-use of water can also be incorporated as part of the formulation.

The result from the linear programming formulation such as shown in FIG. 10 also provides a specific design solution for the minimum fresh water and waste water flows. To summarise, the linear programming approach as illustrated in FIG. 10 is easy to implement, provides rigorous solutions, guarantees optimality and is flexible to incorporate any practical or algorithmic constraints that the designer may wish to impose on the solution.

FIG. 11 shows the LP solution for the example problem as previously described in FIGS. 6, 8 and 9. There is a one to one correspondence between the LP solution and the solution identified via visualisation as shown in FIGS. 8 and 9. In other words it is possible to easily "switch" between the LP solution and the equivalent pinch visualisation modes. This is Illustrated in FIG. 12.

Both of the tools are completely compatible with each other. Based on pinch visualisation, the problem definition can be set and, correspondingly, the solution of the LP formulation can be represented back in pinch visualisation.

FIG. 13 shows a representation of a multiple contaminant problem in a pinch visualisation mode. For each contaminant, a separate set of composite curves can be constructed. The composites may be plotted in one diagram in overlapping mode. The multicomponent representation may provide visual ideas of bottlenecks in water re-use caused by different components on a simultaneous basis.

FIG. 14 summarises a new approach to waste water minimisation incorporating simultaneous use of pinch visualisation and linear programming formulation. For complex multicomponent problems, one could start with a linear programming formulation and obtain the initial solution. This solution will provide the minimum water demand for the given problem basis. It may, however, have some water flow-rates of small magnitude. The maximum penalty for avoiding these water flow-rates will be equal to the water-flow rates that have been forbidden.

Therefore, the overall water penalty would be minimal. This way, the design can be simplified for minimum water demand. Pinch visualisation can be used in parallel to gain additional understanding. In simpler problems it may be possible to start from pinch visualisation and obtain the design improvements. Linear programming formulation in that case may be mainly used to confirm the solution.

In summary the new approaches outlined above may provide a much simpler problem representation and mathematical formulation. They may provide a significantly simpler approach to obtaining design changes to achieve minimum water demands. The approaches may provide a much higher level of flexibility in problem definition and may incorporate a majority of the practical constraints encountered in industrial situations. The approaches can guarantee optimality for a given problem definition.

The new approach can be used very effectively to identify regeneration opportunities (FIG. 3) for fresh and waste water minimisation.

FIG. 15 introduces the construction of a Grand Composite Curve which is a more convenient tool for identifying regeneration opportunities. The Grand Composite Curve can be readily generated from the composite curves as shown in FIG. 15. The horizontal distances between the composite curves (shown as "a" and "b") are translated as distances between the vertical axis and the Grand Composite Curve. The Grand Composite Curve in essence indicates the net flow of water at various contamination levels. The location of Process Pinch is also readily identified. The appropriate placement of a regenerator is "across the pinch" as shown in the figure. This will result in reduction in fresh and waste water. Regeneration opportunity is particularly attractive if the Grand Composite has a large "notch" as shown in FIG. 15. It implies that a small improvement in the contaminant concentrations in the outputs from P1 and P2 will significantly increase the re-use of water.

FIG. 16 shows one option for regeneration using the Grand Composite Curve. It implies that output from P1 and part of the output from P2 (90 te/hr) may be regenerated from 100 ppm to 50 ppm (across the pinch). The resulting water can satisfy demands of P3 and P2 as shown in the figure. The remaining water demands of P2 and P1 are satisfied by fresh water.

The fresh water and waste water generation is therefore reduced to 50 te/hr.

FIG. 17 shows the corresponding process flow scheme directly generated from the Grand Composite Curve of FIG. 16.

To summarise, the Pinch Visualisation using the Grand Composite Curve enables quick identification of regeneration opportunities and guides the development of the appropriate process flow scheme.

The solution in FIGS. 16 and 17 can also be obtained using an LP approach.

A key feature of preferred embodiments of the present invention is that, in specifying the problem to be solved, attention is focused primarily upon connections between process units, largely irrespective of the functions of the units, whereas in conventional techniques, emphasis was given to the functions of the units, which led to a much more complex problem.

Improvement at individual level can always be considered after identifying appropriate connections between the process units. For example, in the suggested flow scheme shown in FIG. 9, one can further investigate the possibility of unit-wise improvements in P2 that will lead to reduced water demand. This may result in reduced recycle flow-rate around the unit.

Advantages of preferred embodiments of the invention may include the following.

The process model for the new approach may be only based on given input and output streams. This model can accommodate almost all practical situations. This is a significant improvement over mass transfer models that are assumed by existing approaches.

The new approach can be applied with different bases. The existing approach is based on an assumption of limiting water profile with a fixed load of contaminants to be removed. This may be impractical in many situations.

In the new approach water flow-rate is an explicit quantity and is directly visualised and monitored. The linear programming formulation also utilises water flows as main parameters. This allows one to gain direct appreciation of the penalties or benefits of various design actions, since water flow is the main objective of the problem in question.

The new technique can address multiple water sources, and multiple water inputs and outputs of the various units.

The network configuration is directly generated from the pinch visualisation or the linear programming formulation. This is significantly simpler than the existing approach.

The new approach can deal with any specification on flow-rates and concentrations. It also provides possibilities of working with most optimistic, actual and most conservative bases for the waste water minimisation. In addition the user is free to specify any other basis for the problem.

The pinch visualisation and linear programming solutions directly indicate network configuration in terms of mixing, splitting of streams and re-use or re-generation opportunities. The existing approach involves very complex design evolution and require expert level knowledge of pinch based design methods.

In the new approach the extension to multiple contaminant situations is significantly simpler. Linear programming can be directly extended by increasing the number of constraint equations. Optimality is still guaranteed and ease of use is still maintained. Pinch visualisation for multiple contaminants does not involve any "shifts" in the plots and still provides useful visual information.

Network design for the multicomponent case is almost automatic due to the linear programming approach. The ability to switch between linear programming and pinch visualisation allows the designer to be in "control" whilst developing the network design configuration.

In the new approach for a multiple contaminant case the model does not require any assumptions regarding relationships between masses of contaminants transferred. This is mainly because the model in the new approach only assumes input and output streams.

The new approach can easily accommodate consideration for multiple sources of fresh water with different qualities. In the existing approaches such an extension introduces additional difficulties in targeting and design.

The new approach can easily accommodate practical constraints such as difficulties in matching certain water sources and demands. These can be easily introduced in the "LP" formulation. The formulation can also consider the various levels of investment required in interconnecting process units, for example, long pipelines required between process units which are far apart.

The new approach can also develop solution as a total cost optimisation of fresh water and waste water treatment costs.

Figure 18B:
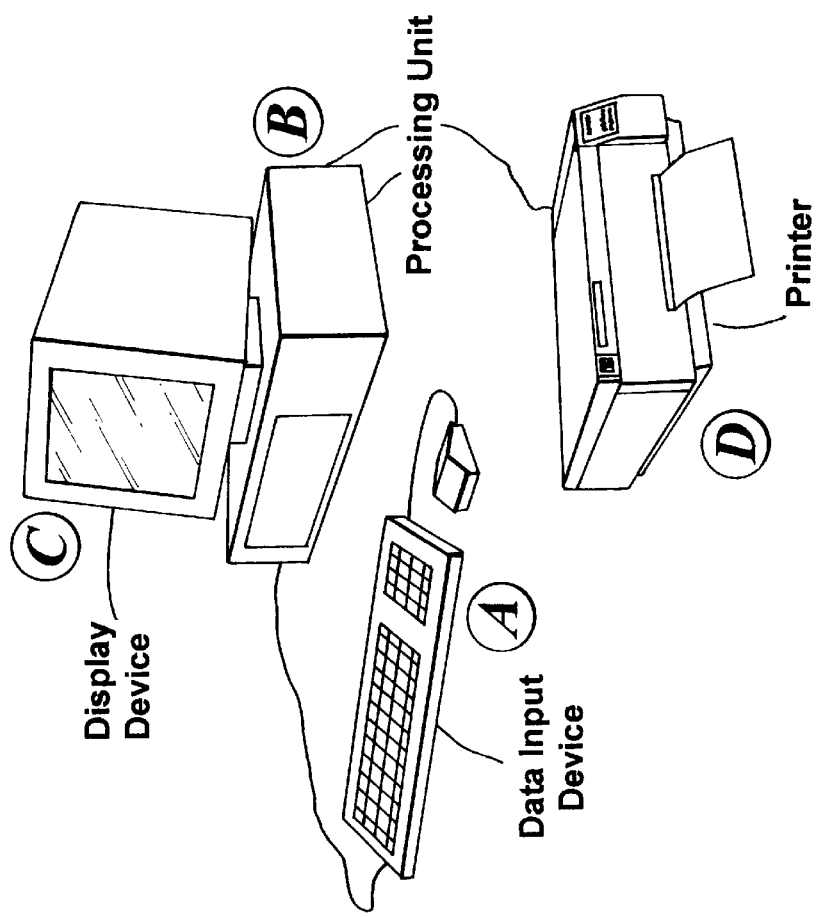
Figure 18A:
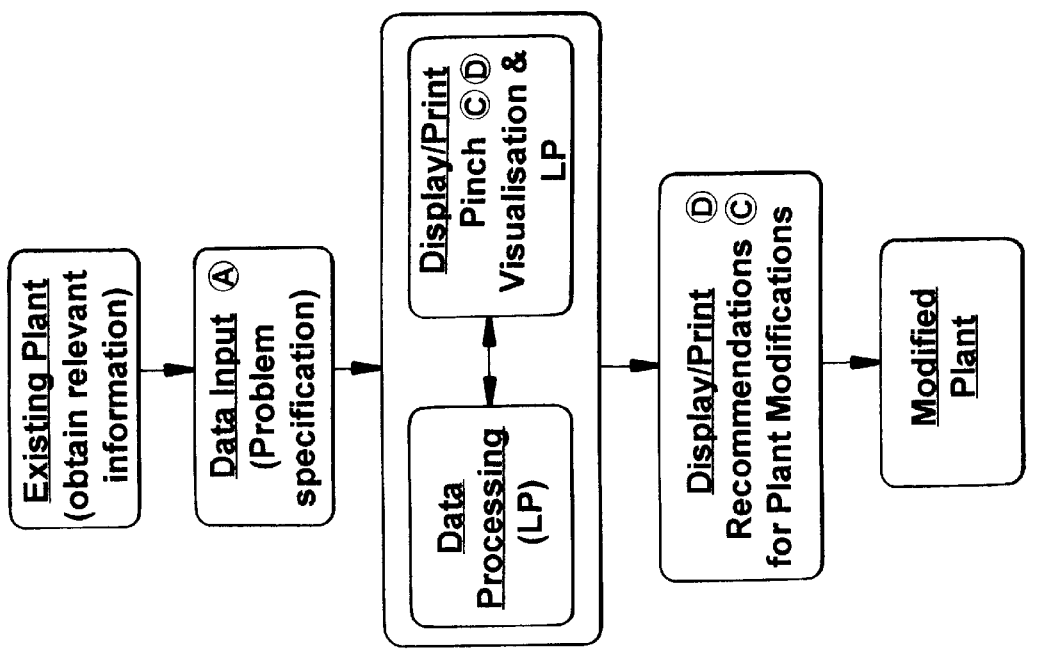

FIG. 18 shows the key steps of the new approach in the flow chart of FIG. 18(a), alongside an illustration of the apparatus In FIG. 18(b).

As a first step the necessary information from the process plant or site is obtained. Based on this information the problem is specified for fresh and waste water minimisation. The data for the problem specification is fed into the apparatus (computer) via the input device (A).

The data is then processed for minimising fresh and waste water using and/or LP Pinch Visualisation calculations. The processing is mainly carried out by the central processing unit (CPU) of the apparatus shown as (B).

The results from the Pinch Visualisation and LP can be displayed on the screen (part (C) of the apparatus) and printed using a printer (part (D) of the apparatus).

The recommendations can be displayed or printed in graphical or tabular form using part (C) and (D) of the apparatus respectively.

The recommendations are then implemented as plant or site modifications in the field.

Although preferred embodiments of the invention are used to minimise waste water, it will be appreciated that other embodiments of the invention may be used more generally to indicate the efficiency of use of a fluid, which need not be water, in a multi-process plant.

As will be apparent to the skilled reader, both purity and concentration can be used as more or less interchangeable parameters, in relation to embodiments of the present invention. Therefore, for the purposes of this specification, any reference to "purity" is to be interpreted as a reference equally to "concentration", and vice-versa.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

APPENDIX

Key Aspects of Pinch Analysis

Key aspects of pinch analysis according to Linnhoff et al are summarised below, with reference to FIGS. A1 to A6 of the accompanying diagrammatic drawings, which are described below.

The use of Pinch Analysis (Linnhoff et al, supra) results in identification of minimum thermal consumption for a process. The analysis also guides the user in achieving the minimum energy consumption by appropriate design of the Heat Exchanger Network.

FIG. A1 shows an existing process flowsheet. The heating and cooling demands of the various process streams are indicated in the figure by temperatures and heat duties.

The process streams that require heating are called the "cold" streams while the process streams requiring cooling are called the "hot" streams. Heat recovery between hot and cold streams is carried out using heat exchangers. This reduces the demand for external utilities. In the existing process the total hot utility demand (shown by H) equals 102 units, whilst the total cold utility model demand (shown by C) equals 60 units.

Composite Curves and Utility Targets

FIG. A2 illustrates the construction of a cold composite curve Two cold streams (C1 and C2) are shown on a temperature-enthalpy diagram in FIG. A2(a). Stream C1 extends over a larger temperature range than stream C2. FIG. A2(b) shows the composite curve of streams C1 and C2. In the temperature range 1 only stream C1 is present with total enthalpy change of 100 units. Therefore the composite curve indicates 100 units of enthalpy change in this temperature region. In the temperature region 2 both streams C1 and C2 are present. Stream C1 demands 100 units. The composite curve therefore shows the net demand of 100+300=400 units.

In the temperature region 3 only stream C1 is present with enthalpy change of 100 units. The net enthalpy change as indicated by the composite curve is 100 units. The composite curve in essence shows total enthalpy change in the various temperature regions. The construction of the hot composite curve is similar to the construction of the cold composite curve as shown in FIG. A2. In a practical application the number of streams is generally much greater, but the composite curves are constructed in exactly the same way.

FIG. A3 (composite curves and energy targets) shows hot and cold composite curves plotted on the same temperature-enthalpy diagram. The diagram represents total heating and cooling requirements of the process.

Along the enthalpy axis the curves overlap. The hot composite curve can be used to heat up the cold composite curve by process-to-process heat exchange. However, at either end an overhang exists such that the top of the cold composite curve needs an external heat source (QHmin) and the bottom of the hot composite curve needs cooling (QCmin). These are minimum utility requirements and are termed as the hot and cold utility targets.

FIG. A3 indicates hot utility target of 48 units and cold utility target of 6 units for the process. These are significantly lower than the existing hot utility consumption of 102 units and cold utility consumption of 60 units respectively.

The point at which the curve comes closest to touching is known as the pinch. At the pinch the curves are separated by the minimum approach temperature DTmin. For a given value of DTmin (in this case 10°), the region of overlap shows the maximum possible amount of process-to-process heat exchange. Furthermore, GHmin and QCmin are minimum utility requirements.

Pinch Principle

Once the pinch and the utility targets of a process have been identified, the three "golden rules" of pinch analysis can be applied. The process can be considered as two separate systems (FIG. A4 pinch principle for minimum energy consumptions)—a system above the pinch and a system below the pinch. The system above the pinch requires only residual heat and is therefore, a heat sink, whereas the system below the pinch has heat to reject and is, therefore, a heat source.

The three rules are as follows:

1) Heat must not be transferred across the pinch.

2) There must be no outside cooling above the pinch.

3) There must be no outside heating below the pinch.

If there is a certain amount of heat travelling across the pinch then an extra amount of hot and cold utility must be supplied equal to the cross pinch heat flow (FIG. A4). Similarly any outside cooling above the pinch and outside heating below the pinch increases the utility requirement. Thus:

Actual Utilities Consumption=Target Utilities Consumption+Cross-pinch heat flow.

Heat Exchanger Network Design

Heat exchanger network design relates to identification of appropriate heat exchanger matches between hot and cold streams in the process such that the overall process meets the minimum utility targets as predicted by the composite curves.

The pinch principle dictates that in order to achieve the minimum utility targets the cross pinch heat flows must be eliminated.

In order to eliminate the cross pinch heat flow we need to ensure that the hot and cold streams in the process are divided into two separate regions—one above the pinch and one below the pinch (FIG. A5 dividing the process flow sheet at pinch temperatures). The division is identified by the pinch temperatures (70° for hot streams and 60° for cold streams).

The next step is to ensure that the heat exchanger matches are made within the individual regions (FIG. A6 design of heat exchanger according to pinch principle). In the above pinch region, the heat available from the hot streams will be fully utilised and in the below pinch process, heat demands of the cold streams will be fully satisfied. The pinch division therefore ensures that the energy targets are realised in actual heat exchanger network design.

FIG. A6 shows a heat exchanger network design that meets the minimum utility targets as indicated by the composite curves in FIG. A3. The new hot utility requirement for the process is 48 units, while the cold utility requirement is 6 units.

Pinch analysis identifies not only the targets for the utility requirements but also ensures that these targets are realised in practical heat exchanger network design.

In order to identify the heat exchanger matches in the above and below pinch regions one needs to follow the detailed heat exchanger network design procedure called the Pinch Design Method which is outlined in Linnhoff et al, supra.

What I claim is:

1. A method of indicating efficiency of use of a fluid in a multi-process unit plant, comprising the steps of:
   a) for each process unit;
      determining the purity of the required input and output of the fluid;
      determining the fluid flow rate of the required input and output of the fluid;
   b) representing in a graphical or tabular form the fluid flow rates and purities of all of the inputs and outputs of all of said process units;
   c) indicating by said graphical or tabular form said efficiency of use of said fluid; and
   d) deriving from said graphical or tabular form representation connections between said process units to increase said efficiency of use of said fluid between said process units.

2. A method according to claim 1, wherein the step of deriving from said graphical or tabular representation connections between said process units increases re-use of said fluid between said process units.

3. A method according to claim 1, wherein the step of deriving from said graphical or tabular representation connections between said process units increases regeneration of said fluid between said process units.

4. A method of increasing efficiency of use of a fluid in a multi-process unit plant, comprising the steps of deriving connections between said process units by a method according to claim 1, and then effecting those connections between said process units.

5. A method according to claim 1, wherein said fluid comprises water.

6. A method according to claim 1, wherein step (d) comprises: for each process unit, comparing fluid flow rate and purity of the required input with the fluid flow rate and purity of the outputs of all other process units to derive said connections.

7. A method according to claim 6, in which step (d) further comprises optimising the connections between the process units according to pre-determined criteria.

8. A method according to claim 6 in which the step of comprising fluid flow rates and purities is carried out using a mathematical method.

9. A method according to claim 8, wherein the equations $$D_j = \Sigma_i SD_{ij} + F_j$$

and $$S_i = \Sigma_j SD_{ij} + W_i$$

where
- $D_j$ = total fluid flow rate for input of process unit j
- $S_i$ = total fluid flow rate for output of process unit i
- $Sd_{ij}$ = fluid flow rate from output of process unit i to process unit j
- $F_j$ = fresh fluid requirement for input of process unit j
- $W_i$ = waste fluid for output of process unit i and $$\Sigma_j (CS_i \times SD_{ij}) / D_j \leq CD_j$$

where
- $CS_i$ = contaminant concentration of output of process unit i
- $Cd_j$ = contaminant concentration of input of process unit j are used to compare flow rates and purities.

10. A method according to claim 1, in which, the output and input of each process unit are represented as a line on a graph, the axes of which are purity and fluid flow rate.

11. A method according to claim 10, in which all the output lines form a curve and all the input lines form a curve and the two curves are shifted parallel to the fluid flow rate axis until they meet.

* * * * *